US011796979B2

United States Patent
Kawai et al.

(10) Patent No.: US 11,796,979 B2
(45) Date of Patent: Oct. 24, 2023

(54) MACHINE TOOL, METHOD FOR CONTROLLING MACHINE TOOL, AND COMPUTER-READABLE STORAGE MEDIUM STORING PROGRAM FOR CONTROLLING MACHINE TOOL

(71) Applicant: DMG MORI CO., LTD., Yamatokoriyama (JP)

(72) Inventors: Kengo Kawai, Yamatokoriyama (JP); Katsuhiko Ono, Yamatokoriyama (JP); Shizuo Nishikawa, Yamatokoriyama (JP); Yasuhiko Morita, Yamatokoriyama (JP); Masanori Murozumi, Yamatokoriyama (JP); Ryo Murakami, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 1176 days.

(21) Appl. No.: 16/431,961

(22) Filed: Jun. 5, 2019

(65) Prior Publication Data

US 2019/0391558 A1 Dec. 26, 2019

(30) Foreign Application Priority Data

Jun. 21, 2018 (JP) .................................. 2018-117794

(51) Int. Cl.
*G05B 19/04* (2006.01)
*G05B 19/404* (2006.01)
(Continued)

(52) U.S. Cl.
CPC ........... *G05B 19/404* (2013.01); *B23Q 15/08* (2013.01); *B23Q 17/0976* (2013.01); *G05B 2219/37434* (2013.01); *G05B 2219/41256* (2013.01)

(58) Field of Classification Search
USPC ........................................................... 702/56
See application file for complete search history.

(56) References Cited

U.S. PATENT DOCUMENTS

2012/0109360 A1* 5/2012 Nishimura ............. B23Q 15/08
700/180
2013/0164092 A1* 6/2013 Kondo ............... B23Q 17/0976
702/56

(Continued)

FOREIGN PATENT DOCUMENTS

JP 2012-088967 5/2012
KR 10-2016-0063176 A 6/2016

*Primary Examiner* — Paul D Lee
(74) *Attorney, Agent, or Firm* — Oblon, McClelland, Maier & Neustadt, L.L.P.

(57) ABSTRACT

A machine tool includes: a display; a tool configured to machine a workpiece; a spindle configured to rotate the tool or the workpiece; a sensor configured to detect a vibration frequency of the spindle or the tool; and a processor configured to control the machine tool. The processor is configured to: detect a chatter vibration in the spindle or the tool based on the vibration frequency; based on a frequency of the chatter vibration, a rotation speed of the spindle, and the number of cutting edges of the tool, calculate an order corresponding to the number of vibrations of the tool during a period of time until a current rotation angle of a first cutting edge of the tool reaches a current rotation angle of a second cutting edge of the tool; and present order information on the display, the order information indicating a magnitude of the calculated order.

17 Claims, 19 Drawing Sheets

(51) Int. Cl.
  *B23Q 15/08* (2006.01)
  *B23Q 17/09* (2006.01)

(56) References Cited

U.S. PATENT DOCUMENTS

| | | | |
|---|---|---|---|
| 2015/0338842 A1* | 11/2015 | Ono | G05B 19/404 |
| | | | 700/175 |
| 2017/0153208 A1* | 6/2017 | Kawai | G01M 1/30 |
| 2018/0004196 A1* | 1/2018 | Kawai | G05B 23/0272 |
| 2020/0125072 A1* | 4/2020 | Yamamoto | G05B 19/4063 |

* cited by examiner

FIG.11
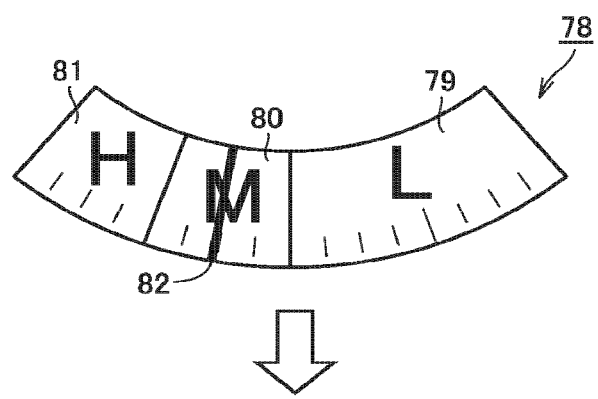
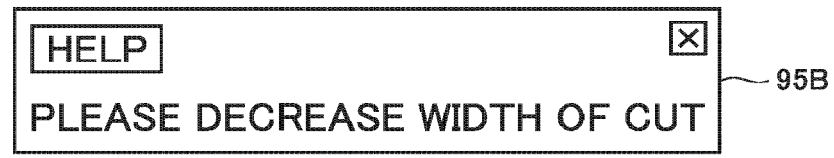

FIG.12
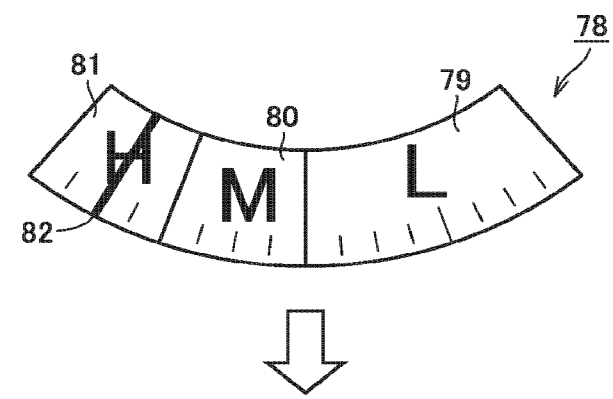
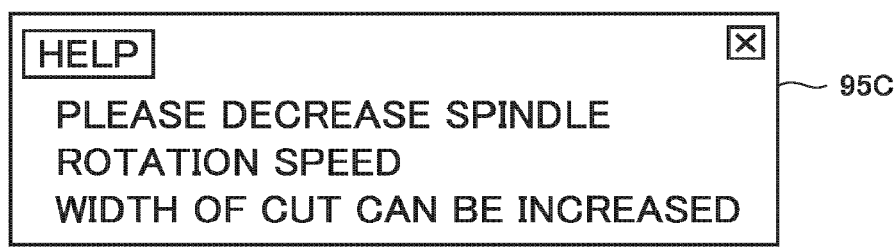

| ORDER SEGMENT | ORDER RANGE | RECOMMENDED OPERATION MANNER |
|---|---|---|
| L | MORE THAN OR EQUAL TO 1 AND LESS THAN 10 | OPERATION MANNER 95A |
| M | MORE THAN OR EQUAL TO 10 AND LESS THAN 15 | OPERATION MANNER 95B |
| H | MORE THAN OR EQUAL TO 15 | OPERATION MANNER 95C |

FIG.16
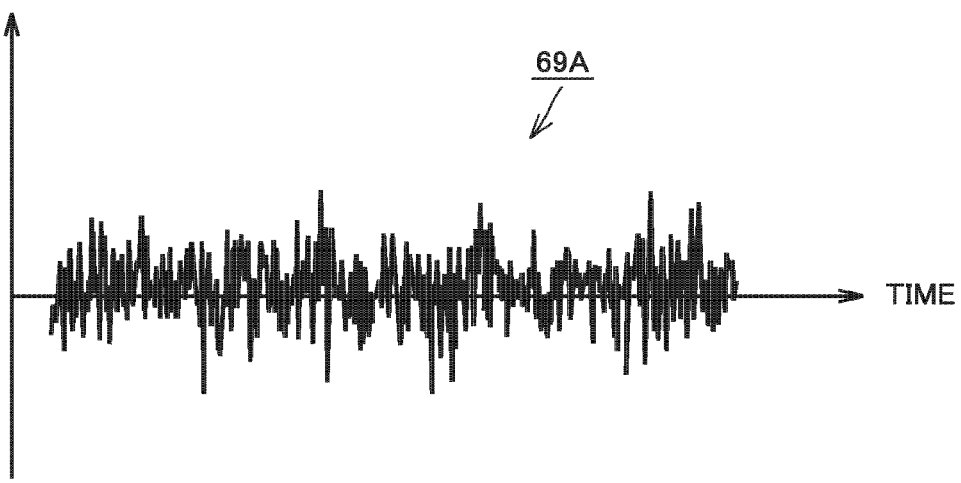
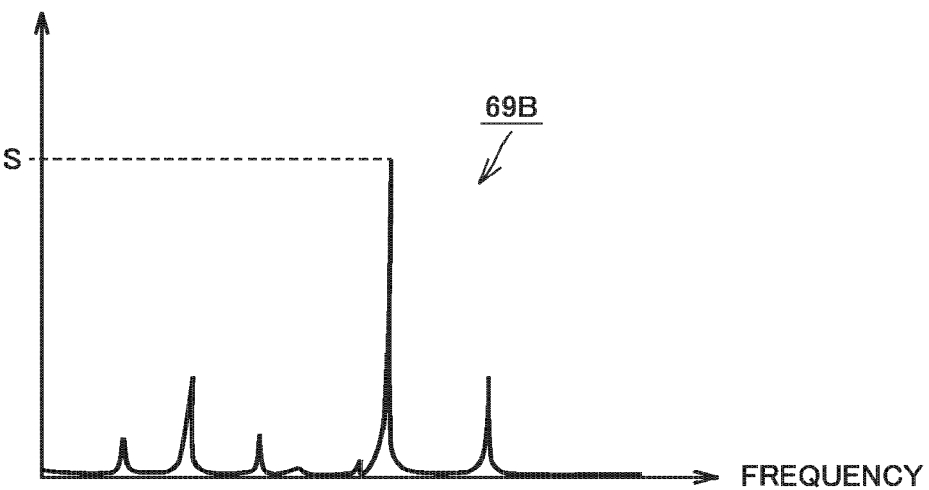

MACHINE TOOL, METHOD FOR CONTROLLING MACHINE TOOL, AND COMPUTER-READABLE STORAGE MEDIUM STORING PROGRAM FOR CONTROLLING MACHINE TOOL

BACKGROUND OF THE INVENTION

Field of the Invention

The present disclosure relates to a technique for presenting, to a user, an index for suppressing a chatter vibration.

Description of the Background Art

When cutting a workpiece using a machine tool, a cutting edge of a tool may be vibrated. Such a vibration is referred to as "chatter vibration". Generation of such a chatter vibration leads to decreased precision in cutting a workpiece.

In order to suppress such a chatter vibration, a user needs to know a state of the chatter vibration that is being generated. Japanese Patent Laying-Open No. 2012-088967 discloses a machine tool configured to present a state of a chatter vibration on a monitor. This machine tool presents, on a graph, a relation between a spindle rotation speed upon generation of a chatter vibration and an acceleration of the chatter vibration.

The chatter vibration is a vibration generated when a relation between the spindle rotation speed and a width of cut of the workpiece by the tool satisfies a predetermined condition. Hence, when the spindle rotation speed and the width of cut of the workpiece are adjusted, the chatter vibration can be suppressed.

The machine tool disclosed in Japanese Patent Laying-Open No. 2012-088967 merely presents the relation between the spindle rotation speed and the acceleration of the chatter vibration as information of the generated chatter vibration. Accordingly, the user does not intuitively understand how control parameters such as the spindle rotation speed and the width of cut of the workpiece should be adjusted.

SUMMARY OF THE INVENTION

In one example of the present disclosure, a machine tool includes: a display; a tool configured to machine a workpiece; a spindle configured to rotate the tool or the workpiece; a sensor configured to detect a vibration frequency of the spindle or the tool; and a processor configured to control the machine tool. The processor is configured to: detect a chatter vibration in the spindle or the tool based on the vibration frequency; based on a frequency of the chatter vibration, a rotation speed of the spindle, and the number of cutting edges of the tool, calculate an order corresponding to the number of vibrations of the tool during a period of time until a current rotation angle of a first cutting edge of the tool reaches a current rotation angle of a second cutting edge of the tool; and present order information on the display, the order information indicating a magnitude of the calculated order.

In another example of the present disclosure, a method for controlling a machine tool includes: rotating a spindle configured to drive to rotate a workpiece or a tool; detecting a vibration frequency of the spindle or the tool; detecting a chatter vibration in the spindle or the tool based on the vibration frequency; based on a frequency of the chatter vibration, a rotation speed of the spindle, and the number of cutting edges of the tool, calculating an order corresponding to the number of vibrations of the tool during a period of time until a current rotation angle of a first cutting edge of the tool reaches a current rotation angle of a second cutting edge of the tool; and presenting order information on a display of the machine tool, the order information indicating a magnitude of the calculated order.

In another example of the present disclosure, a computer-readable storage medium stores a program for controlling a machine tool and the program causes the machine tool to perform: rotating a spindle configured to drive to rotate a workpiece or a tool; detecting a vibration frequency of the spindle or the tool; detecting a chatter vibration in the spindle or the tool based on the vibration frequency; based on a frequency of the chatter vibration, a rotation speed of the spindle, and the number of cutting edges of the tool, calculating an order corresponding to the number of vibrations of the tool during a period of time until a current rotation angle of a first cutting edge of the tool reaches a current rotation angle of a second cutting edge of the tool; and presenting order information on a display of the machine tool, the order information indicating a magnitude of the calculated order.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows a presented, exemplary recommended operation manner.

FIG. 12 shows a presented, exemplary recommended operation manner.

FIG. 16 shows a sampled vibration frequency.

DESCRIPTION OF THE PREFERRED EMBODIMENTS

Figure 1:
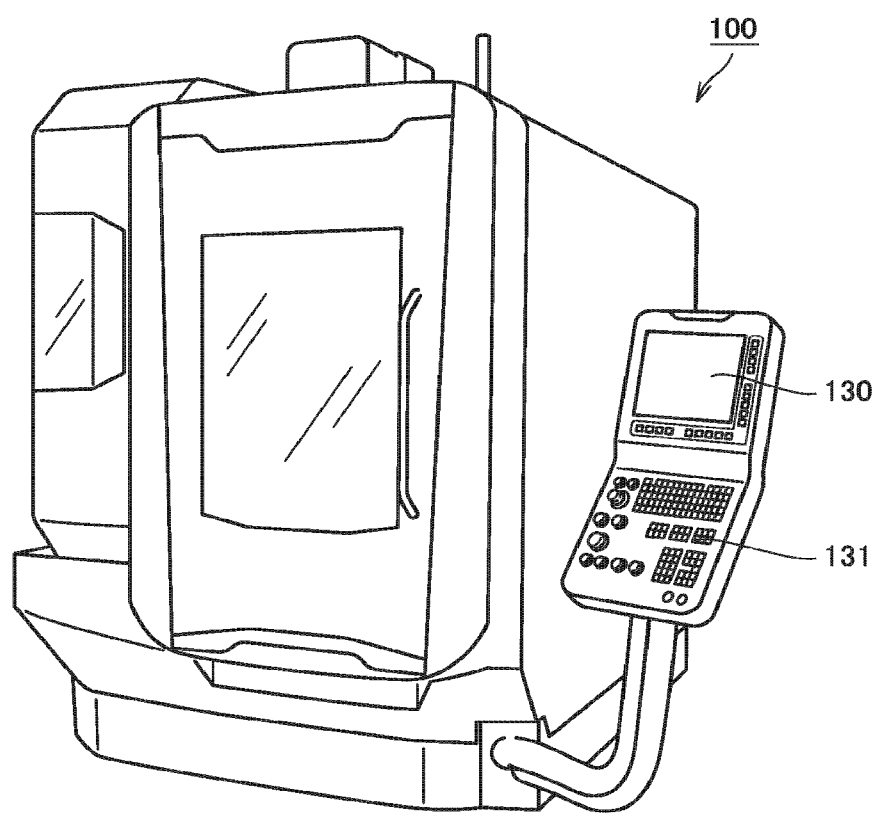
FIG. 1 shows an external appearance of a machine tool according to an embodiment.

The following describes each of embodiments according to the present invention with reference to figures. In the description below, the same reference characters are given to the same parts and components. Their names and functions are also the same. Hence, they are not described in detail repeatedly. It should be noted that the embodiments and modifications described below may be selectively combined appropriately.

<A. Configuration of Machine Tool 100>

Figure 2:
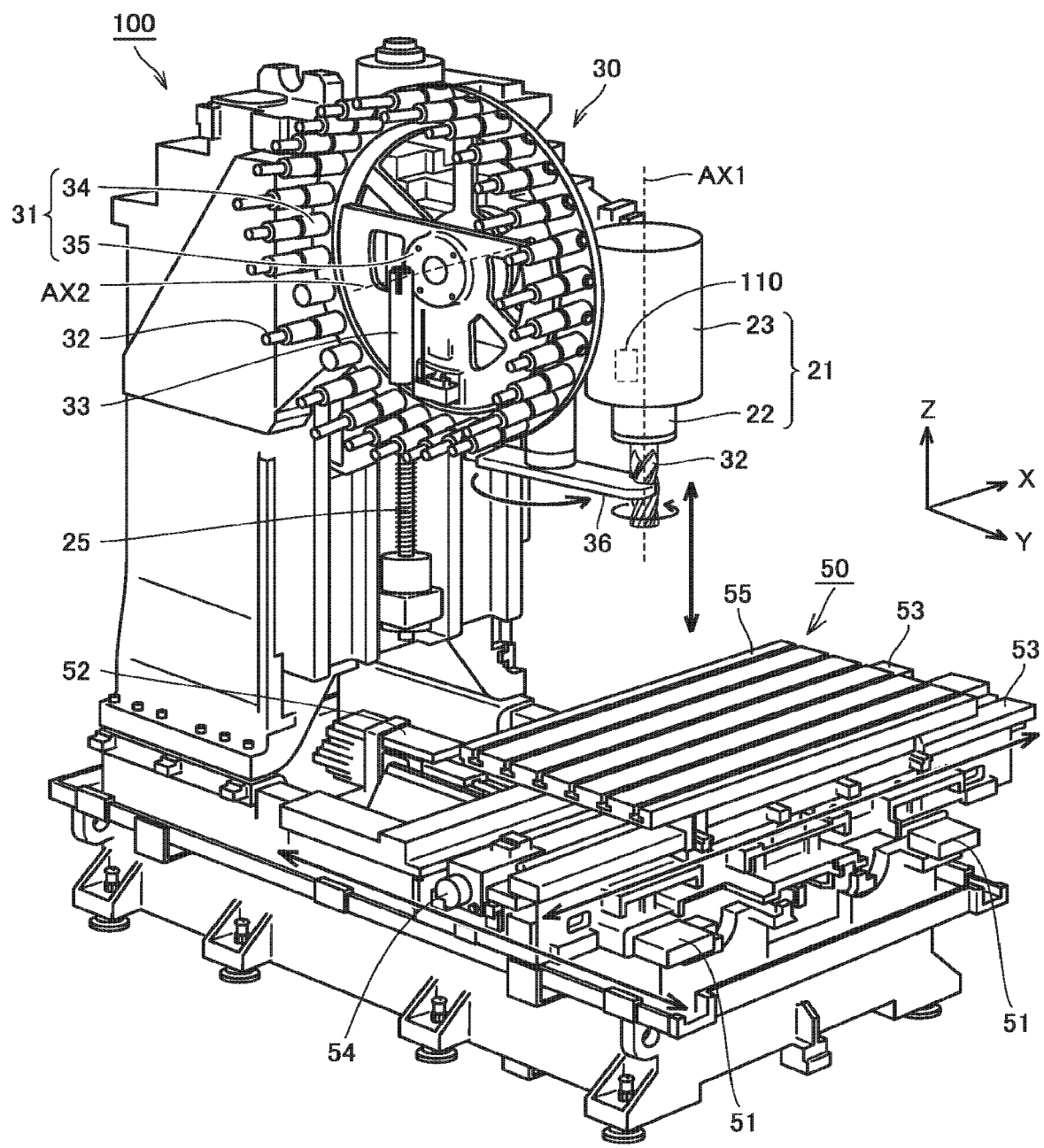
FIG. 2 shows an exemplary internal structure of the machine tool according to the embodiment.

With reference to FIG. 1 and FIG. 2, a configuration of a machine tool 100 will be described. FIG. 1 shows an external appearance of machine tool 100. FIG. 2 shows an exemplary internal structure of machine tool 100.

Machine tool 100 serving as a machining center is shown in each of FIG. 1 and FIG. 2. In the description below, machine tool 100 serving as a machining center will be described; however, machine tool 100 is not limited to the machining center. For example, machine tool 100 may be a lathe, a different cutting machine, or a different grinding machine. Moreover, machine tool 100 may be a vertical type machining center in which a tool is attached in a vertical direction, or may be a horizontal type machining center in which a tool is attached in a horizontal direction.

Machine tool 100 includes: a display 130 configured to present various types of information about cutting; and an input device 131 configured to receive various types of operations for machine tool 100.

Moreover, machine tool 100 has a spindle head 21 therein. Spindle head 21 is constituted of a spindle 22 and a housing 23. Spindle 22 is disposed inside housing 23. A tool for machining a workpiece is attached to spindle 22. In the example of FIG. 2, a tool 32 serving as an end mill is attached to spindle 22.

Spindle head 21 is configured to be driven in a Z-axis direction along a ball screw 25. A drive mechanism, such as a servomotor, is connected to ball screw 25. The drive mechanism drives ball screw 25 to move spindle head 21, thereby moving spindle head 21 to an appropriate position in the Z-axis direction.

Moreover, a drive mechanism, such as a servomotor, is connected to spindle 22. This drive mechanism is configured to drive to rotate spindle 22 with respect to a center axis AX1 parallel to the Z-axis direction (vertical direction). As a result, tool 32 attached to spindle 22 is rotated with respect to center axis AX1 according to rotation of spindle 22. It should be noted that when machine tool 100 is a lathe, a workpiece is attached to spindle 22. In this case, the workpiece attached to spindle 22 is rotated according to rotation of spindle 22.

Machine tool 100 further has an automatic tool changer (ATC) 30. Automatic tool changer 30 is constituted of a magazine 31, a pushing mechanism 33, and an arm 36. Magazine 31 is an apparatus configured to store various types of tools 32 for machining workpieces. Magazine 31 is constituted of a plurality of tool holding portions 34 and a sprocket 35.

Tool holding portions 34 are configured to hold various types of tools 32. The plurality of tool holding portions 34 are annularly arranged to surround sprocket 35. Sprocket 35 is provided to be driven by a motor so as to be rotatable with respect to a center axis AX2 parallel to the X axis. According to the rotation of sprocket 35, the plurality of tool holding portions 34 are moved to rotate with respect to center axis AX2.

Based on reception of a tool replacement instruction, automatic tool changer 30 removes, from magazine 31, a target tool 32 to be attached, and then attaches this tool 32 to spindle 22. More specifically, automatic tool changer 30 moves a tool holding portion 34 holding target tool 32 so as to be positioned in front of pushing mechanism 33. Next, pushing mechanism 33 pushes target tool 32 to a replacement position for arm 36. Then, arm 36 removes target tool 32 from tool holding portion 34 and removes a currently attached tool 32 from spindle 22. Then, arm 36 is half-rotated with these tools 32 being held, attaches target tool 32 to spindle 22, and stores formerly attached tool 32 in tool holding portion 34. In this way, tools 32 are replaced with each other.

Machine tool 100 further includes a moving mechanism 50 configured to move a workpiece to be machined, on an XY plane. Moving mechanism 50 is constituted of guides 51, 53, ball screws 52, 54, and a table 55 (workpiece holding portion) for holding a workpiece.

Guide 51 is installed in parallel with the Y axis. Guide 53 is provided on guide 51 and is installed in parallel with the X axis. Guide 53 is configured to be driven along guide 51. Table 55 is provided on guide 53, and is configured to be driven along guide 53.

A drive mechanism, such as a servomotor, is connected to ball screw 52. This drive mechanism drives ball screw 52 to move guide 53 along guide 51, thereby moving guide 53 to an appropriate position in the Y-axis direction. Similarly, a drive mechanism, such as a servomotor, is also connected to ball screw 54. This drive mechanism drives ball screw 54 to move table 55 along guide 53, thereby moving table 55 to an appropriate position in the X-axis direction. That is, machine tool 100 cooperatively controls the drive mechanisms respectively connected to ball screws 52, 54 so as to move table 55 to an appropriate position on the XY plane. Accordingly, machine tool 100 can machine the workpiece held on table 55 while moving the workpiece on the XY plane.

Housing 23 is provided with an acceleration sensor 110 configured to detect a vibration frequency of spindle 22 or tool 32. Preferably, a plurality of acceleration sensors 110 are provided at housing 23 to detect vibrations of spindle 22 or tool 32 in different directions (for example, X, Y, and Z directions). It should be noted that the sensor for detecting the vibration frequency is not limited to acceleration sensor 110, and it is possible to use any sensor that can detect the vibration frequency of tool 32 or spindle 22.

<B. Principle of Generation of Regenerative Chatter Vibration>

When cutting a workpiece using machine tool 100, a regenerative chatter vibration, i.e., a vibration of a cutting edge of tool 32, may be generated. Such a regenerative chatter vibration is a vibration generated when a relation between the rotation speed of spindle 22 and the width of cut of the workpiece by tool 32 satisfies a predetermined condition.

Figure 3:
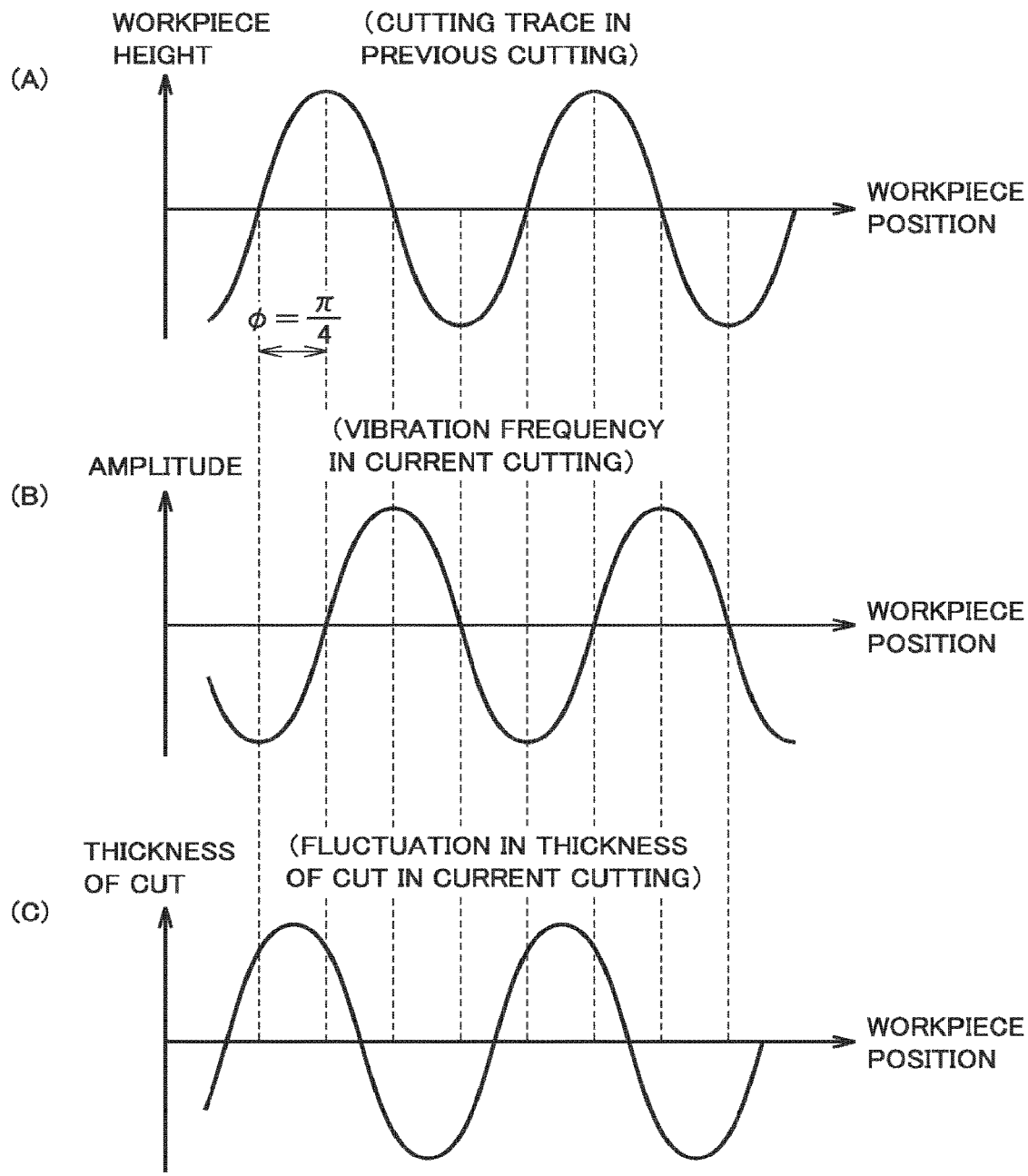
FIG. 3 shows an exemplary cutting condition under which a regenerative chatter vibration is likely to be generated.

With reference to FIG. 3 to FIG. 6, the following describes a principle of generation of the regenerative chatter vibration. FIG. 3 shows an exemplary cutting condition under which the regenerative chatter vibration is likely to be generated. More specifically, an illustration (A) of FIG. 3 shows a cutting trace on the workpiece in previous cutting. An illustration (B) of FIG. 3 shows a vibration frequency of tool 32 in current cutting. An illustration (C) of FIG. 3 shows a thickness of cut of the workpiece by tool 32 in the current cutting.

Tool 32 cuts the workpiece by rotating to repeatedly cut the workpiece. Tool 32 is vibrated during the cutting of the workpiece, thus resulting in irregularity in the cut surface of the workpiece as shown in the illustration (A) of FIG. 3.

In cutting the workpiece using tool 32, the cutting trace in the previous cutting and the vibration frequency of tool 32 in the current cutting may be deviated from each other. Assuming that this deviation is represented by "ϕ", deviation ϕ is π/4 (=90°) in the example of the illustration (A) of FIG. 3 and the illustration (B) of FIG. 3. Such a deviation leads to a fluctuation in the thickness of cut of the workpiece depending on cutting positions. The illustration (C) of FIG. 3 shows a fluctuation in the thickness of cut when deviation ϕ=π/4. The fluctuation in the thickness of cut causes a fluctuation in force applied from the workpiece to tool 32 during the cutting, with the result that the regenerative chatter vibration is likely to be generated. Particularly, when ϕ=π/4, the regenerative chatter vibration is the most likely to be generated.

Figure 4:
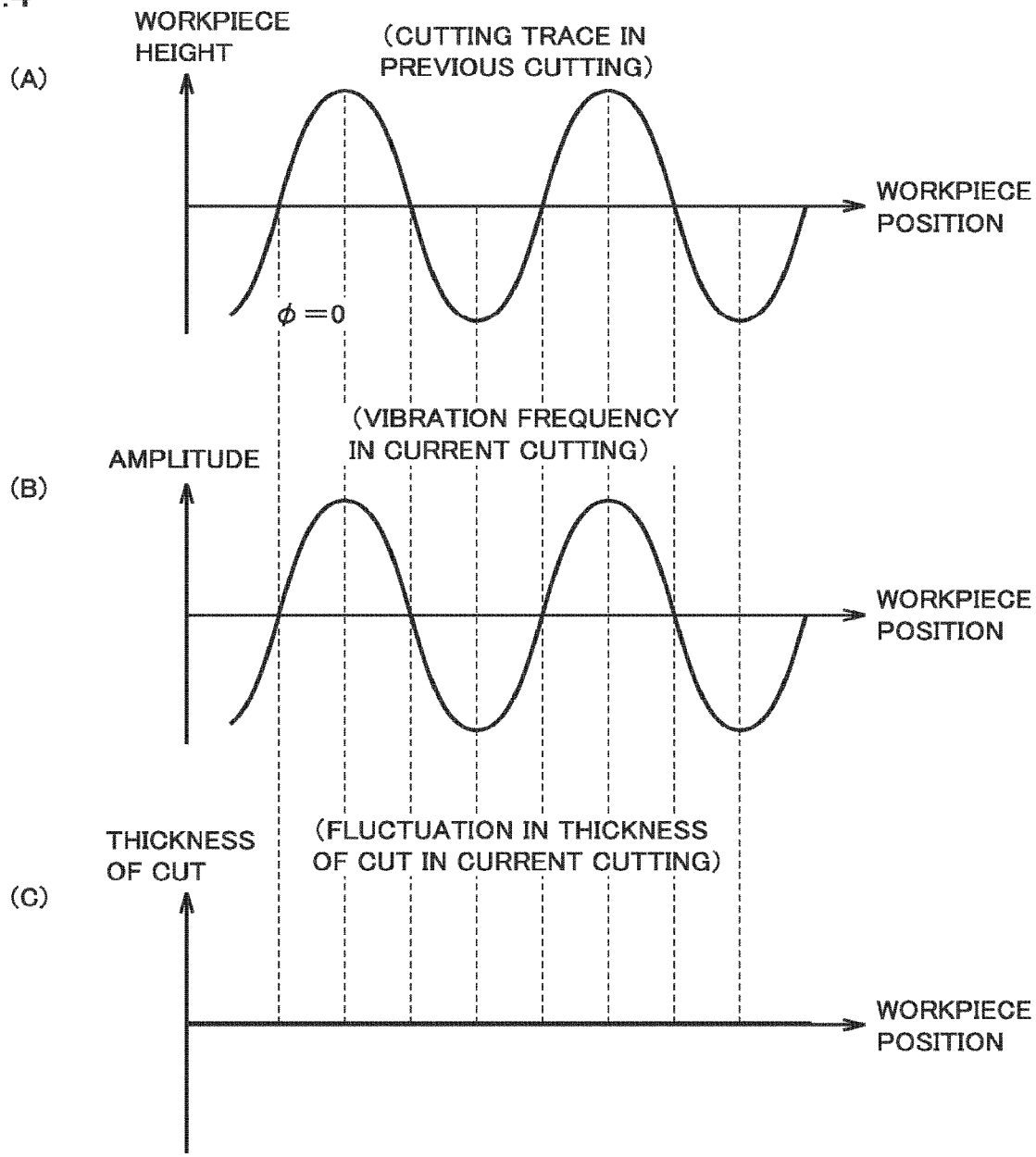
FIG. 4 shows an exemplary cutting condition under which the regenerative chatter vibration is less likely to be generated.

FIG. 4 shows an exemplary cutting condition under which the regenerative chatter vibration is less likely to be generated. More specifically, an illustration (A) of FIG. 4 shows a cutting trace on the workpiece in previous cutting. An illustration (B) of FIG. 4 shows a vibration frequency of tool 32 in current cutting. An illustration (C) of FIG. 4 shows a thickness of cut of the workpiece by tool 32 in the current cutting.

In the example of the illustration (A) of FIG. 4 and the illustration (B) of FIG. 4, the vibration frequency of tool 32 overlaps with the cutting trace in the previous cutting. In this case, deviation "ϕ" is 0, thus resulting in a constant thickness of cut of the workpiece. Accordingly, force applied from the workpiece to tool 32 during the cutting becomes constant, with the result that the regenerative chatter vibration is less likely to be generated.

Hence, when the rotation speed of spindle 22 is adjusted to make deviation "ϕ" closer to 0, the regenerative chatter vibration is less likely to be generated. Meanwhile, when the rotation speed of spindle 22 is adjusted to make deviation "ϕ" closer to π/4, the regenerative chatter vibration is more likely to be generated.

Typically, when "k" indicated in the following formula (1) is an integer, deviation "ϕ" is 0.

(Formula 1)

$$k = 60 \cdot f_c / (n_0 \cdot N) \quad (1)$$

"k" shown in the formula (1) is referred to as "order". "k" represents the number of undulations formed in the cut surface due to the vibration of tool 32 during a period of time from a time of contact of a first cutting edge of tool 32 with the workpiece to a time of contact of a second cutting edge of tool 32 with the workpiece. That is, "k" corresponds to the number of vibrations of tool 32 during a period of time until a current rotation angle of the first cutting edge of tool 32 reaches a current rotation angle of the second cutting edge of tool 32. "$f_c$" represents the vibration frequency of spindle 22. "N" represents the number of cutting edges of tool 32. "$n_0$" represents the rotation speed of spindle 22. The term "rotation speed" herein refers to the rotation speed of spindle 22 per unit time (for example, per minute). Since tool 32 is moved in relation with spindle 22, the rotation speed of spindle 22 is equal to the rotation speed of tool 32. Hence, the rotation speed of spindle 22 means the same as the rotation speed of tool 32. In the description below, the rotation speed of spindle 22 or tool 32 will be also referred to as "spindle rotation speed".

Figure 5:
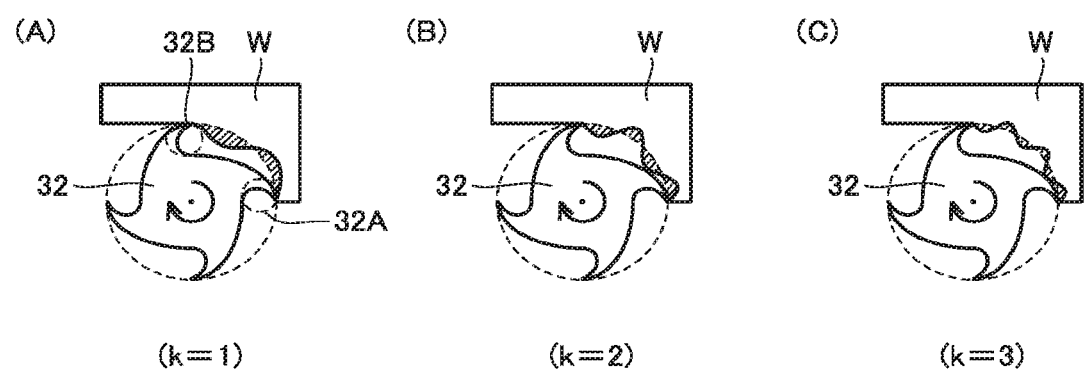
FIG. 5 shows a manner of cutting a workpiece when an order is an integer.

FIG. 5 shows a manner of cutting a workpiece W when order k is an integer. FIG. 5 shows states of tool 32 and workpiece W when seen in the axial direction of spindle 22.

An illustration (A) of FIG. 5 shows a manner of cutting workpiece W when order k is 1. When order k is 1 as shown in the illustration (A) of FIG. 5, the number of undulations formed in the cut surface due to vibration of tool 32 during a period of time from a time of contact of a cutting edge 32A of tool 32 with workpiece W to a time of contact of a cutting edge 32B of tool 32 with workpiece W is 1.

An illustration (B) of FIG. 5 shows a manner of cutting workpiece W when order k is 2. The tool rotation speed in the manner of cutting in the illustration (B) of FIG. 5 corresponds to ½ of the spindle rotation speed in the manner of cutting in the illustration (A) of FIG. 5. When order k is 2 as shown in the illustration (B) of FIG. 5, the number of undulations in the cut surface of workpiece W is 2.

An illustration (C) of FIG. 5 shows a manner of cutting workpiece W when order k is 3. The spindle rotation speed in the manner of cutting in the illustration (C) of FIG. 5 corresponds to ⅓ of the spindle rotation speed in the manner of cutting in the illustration (A) of FIG. 5. When order k is 3 as shown in the illustration (C) of FIG. 5, the number of undulations in the cut surface of workpiece W is 3.

In each of the manners of cutting as shown in the illustration (A) of FIG. 5 to the illustration (C) of FIG. 5, deviation "ϕ" is 0 and therefore the regenerative chatter vibration is less likely to be generated.

Figure 6:
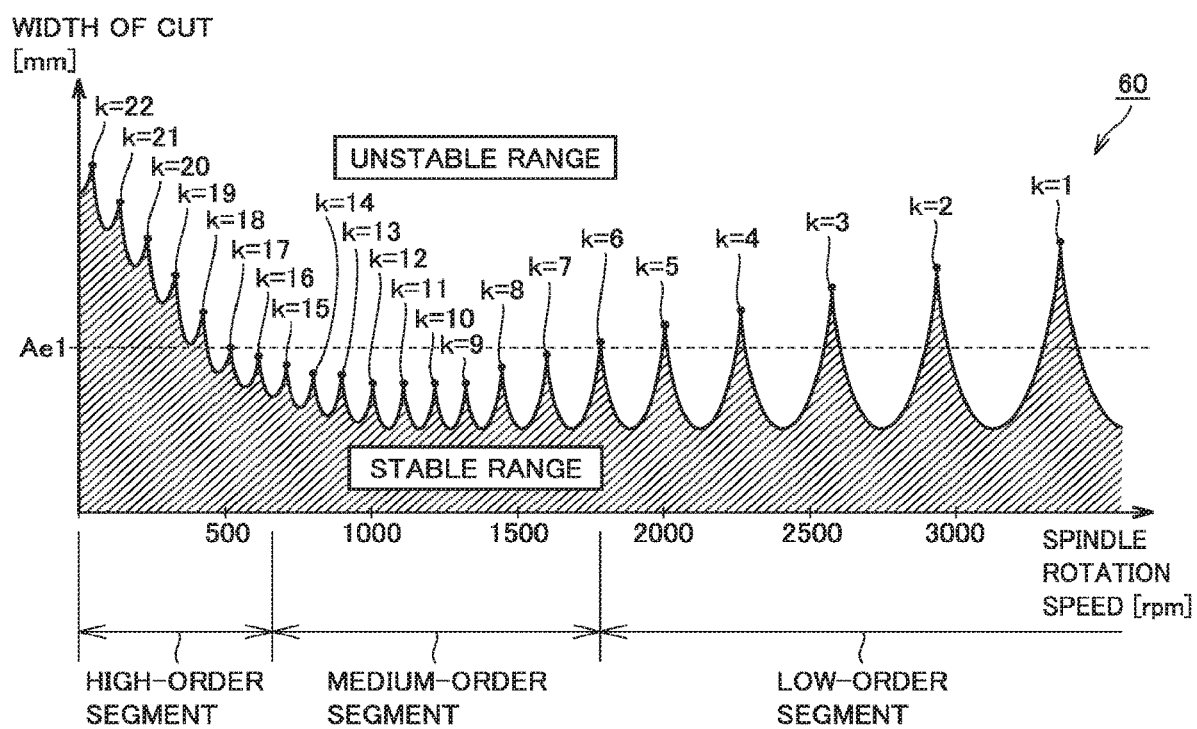
FIG. 6 shows a range of cutting conditions under which no regenerative chatter vibration is generated in a cutting condition relation between a spindle rotation speed and a width of cut of a workpiece.

Whether or not the regenerative chatter vibration is generated is determined by a relation between the spindle rotation speed and the width of cut of workpiece W. FIG. 6 shows a range (hereinafter, also referred to as "stable range") of cutting conditions under which no regenerative chatter vibration is generated and a range (hereinafter, also referred to as "unstable range") of cutting conditions under which the regenerative chatter vibration is generated in the cutting condition relation between the spindle rotation speed and the width of cut of workpiece W. In FIG. 6, the relation between the stable range and the unstable range is shown as a stability limit diagram 60. Hatching is provided to the stable range, whereas no hatching is provided to the unstable range.

The horizontal axis of the graph shown in FIG. 6 represents the spindle rotation speed. The vertical axis of the graph shown in FIG. 6 represents the width of cut of the workpiece. The term "width of cut" herein is a concept encompassing: a width of cut of workpiece W by tool 32 in the axial direction of spindle 22 (hereinafter, also referred to as "width of cut Ap"); and a width of cut of workpiece W by tool 32 in a direction orthogonal to the axial direction of spindle 22 and orthogonal to the moving direction of tool 32 relative to workpiece W (hereinafter, also referred to as "width of cut Ae"). That is, the vertical axis of the graph shown in FIG. 6 may be represented by width of cut Ap or may be represented by width of cut Ae.

Figure 7:
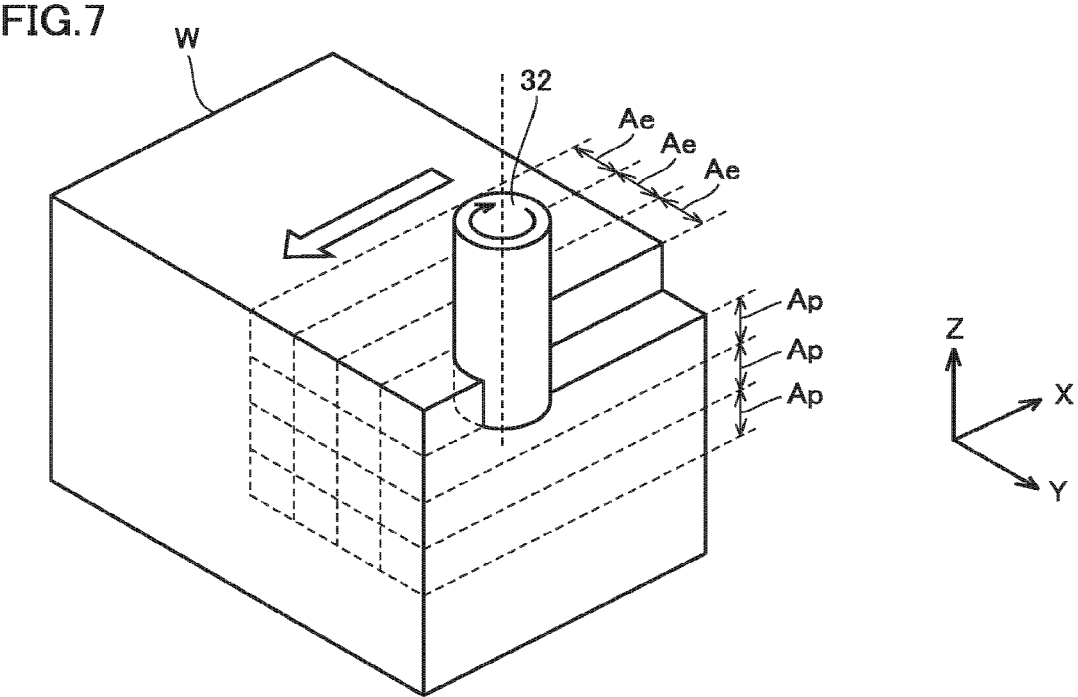
FIG. 7 shows a manner of cutting the workpiece using a tool.

FIG. 7 shows a manner of cutting workpiece W by tool 32. FIG. 7 shows tool 32 serving as an end mill. Tool 32 has a side surface with a plurality of cutting edges, and cuts workpiece W by rotating in contact with workpiece W.

FIG. 7 shows tool 32 serving as an end mill. Tool 32 has the side surface with the plurality of cutting edges and cuts workpiece W by rotating along a predetermined path in contact with workpiece W. As one example, tool 32 sequentially cuts, by width of cut Ae, a first line of cut portion with width of cut Ap. Next, tool 32 sequentially cuts, by width of cut Ae, a second line of cut portion with width of cut Ap. By repeating the cutting in this way, tool 32 cuts workpiece W into an appropriate shape.

<C. Vibration Monitoring Screen>

Machine tool 100 according to the present embodiment presents, on display 130 (display portion), a vibration monitoring screen for monitoring the regenerative chatter vibration. In the description below, the vibration monitoring screen will be described with reference to FIG. 6 and FIG. 8.

Figure 8:
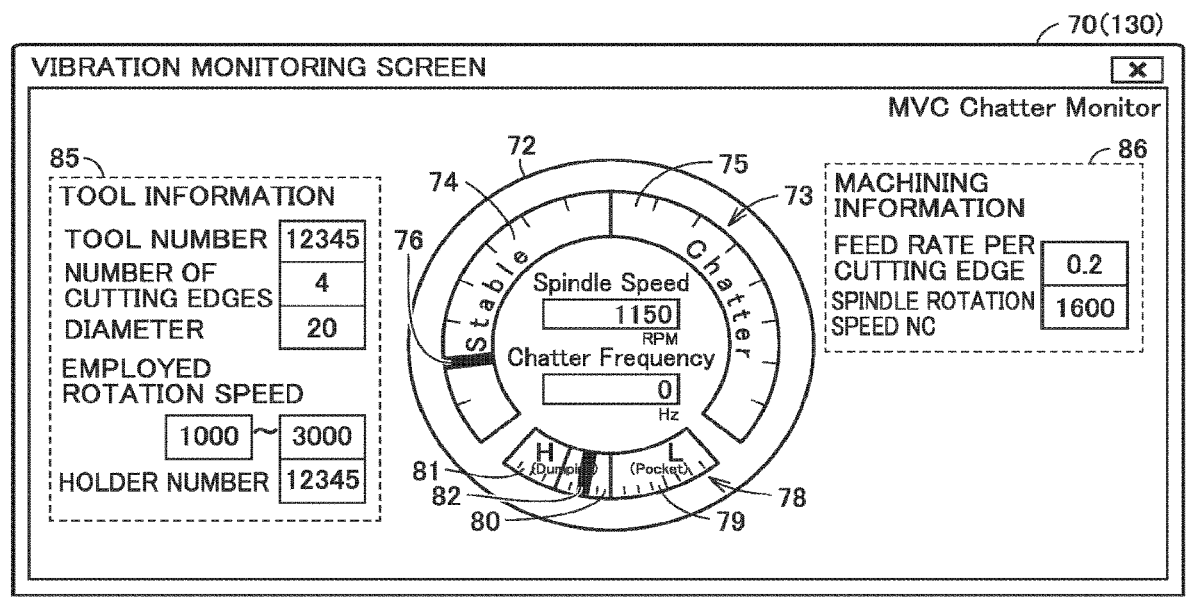
FIG. 8 shows a vibration monitoring screen presented on a display.

FIG. 8 shows a vibration monitoring screen 70 presented on display 130. Vibration monitoring screen 70 includes a vibration information presentation section 72, a tool information presentation section 85, and a machining information presentation section 86.

The following sequentially describes these screen components.

(C1. Vibration Information Presentation Section 72)

Vibration information presentation section 72 presents various types of information about the regenerative chatter vibration. As one example, vibration information presentation section 72 includes a vibration meter 73 and an order meter 78.

Vibration meter 73 presents a current vibration strength of tool 32 to the user by way of a pointer 76. Pointer 76 is moved clockwise or counterclockwise in relation with the vibration strength of tool 32. Vibration meter 73 is divided into a low-vibration strength segment 74 and a high-vibration strength segment 75. When pointer 76 belongs to low-vibration strength segment 74, no regenerative chatter vibration is being generated. When pointer 76 belongs to high-vibration strength segment 75, the regenerative chatter vibration is being generated.

Order meter 78 presents order information indicating a magnitude of the current order. The term "order information" herein is a concept encompassing: a number directly representing the magnitude of the current order; an image object indirectly representing the magnitude of the current order; and the like. In the example of FIG. 8, order meter 78 is shown as an image object representing the current order. Order meter 78 presents the current order to the user by way of a pointer 82 that is in relation with the current order. Typically, pointer 82 is moved toward the left side of the screen as the current order is higher, and is moved toward the right side of the screen as the current order is lower.

As one example, order meter 78 is divided into a low-order segment 79, a medium-order segment 80, and a high-order segment 81. As shown in FIG. 6, the stable range exists in low-order segment 79 at width of cut Ae1. Hence, the regenerative chatter vibration can be suppressed by only adjusting the spindle rotation speed. That is, when pointer 82 belongs to low-order segment 79, the user can judge that the regenerative chatter vibration can be suppressed by only changing the spindle rotation speed.

Moreover, the stable range does not exist in medium-order segment 80 at width of cut Ae1. Hence, the regenerative chatter vibration cannot be suppressed by only adjusting the spindle rotation speed. That is, when pointer 82 belongs to medium-order segment 80, the user can judge that the width of cut of workpiece W needs to be smaller than the current width of cut.

Moreover, when pointer 82 belongs to high-order segment 81, the user can know that a damping region is close. The damping region refers to a region in which no regenerative chatter vibration is generated even when the width of cut is increased. That is, when pointer 82 belongs to high-order segment 81, the user can judge that the regenerative chatter vibration can be suppressed by decreasing the spindle rotation speed to be lower than the current spindle rotation speed and can judge that the width of cut of workpiece W can be increased.

Since the order information indicating the magnitude of the current order is presented on vibration monitoring screen 70 in this way, machine tool 100 can assist the user in adjusting a control parameter.

Preferably, machine tool 100 presents the order information on vibration monitoring screen 70 in such a presentation manner that the order segment to which the current order belongs is distinguishable from the other order segments. Typically, the order segment to which the current order belongs is presented in an emphasized manner as compared with the other order segments. Any emphasizing method is employed. As one example, the order segment to which the current order belongs is presented in a color different from those of the other order segments. Alternatively, the order segment to which the current order belongs is presented to be darker than the other order segments. Since the order segment to which the current order belongs is presented in the emphasized manner as compared with the other order segments, the user can readily distinguish the order segment to which the current order belongs, and can more intuitively judge how the spindle rotation speed and the width of cut should be adjusted.

It should be noted that in the example of FIG. 8, there are the three divided order segments; however, there may be two divided order segments or may be four or more divided order segments. As one example, the orders are divided into the following two order segments: a first order segment (for example, the low-order segment); and a second order segment (for example, the high-order segment). The upper limit value of the first order segment is more than or equal to the lower limit value of the second order segment. Preferably, the range represented by each order segment is larger at the lower order side. That is, the range of orders represented by the low-order, first order segment is larger than the range of orders represented by the high-order, second order segment.

(C2. Tool Information Presentation Section 85)

In tool information presentation section 85, various types of information about the tool used for machining are presented. For example, the presented tool information include: a tool number; the number of cutting edges of the tool; the diameter of the tool; a range of spindle rotation speeds at which the tool can be used safely; a holder number for identifying tool holding portion 34 (see FIG. 2); and the like.

(C3. Machining Information Presentation Section 86)

In machining information presentation section 86, a current machining condition (control parameter) for tool 32 is presented. For example, the presented machining condition includes: a feed rate per cutting edge of tool 32; the spindle rotation speed; and the like.

<D. Method for Determining Order Segment>

The respective ranges of the order segments indicated in order meter 78 of vibration monitoring screen 70 (see FIG. 8) may be determined in advance at the time of designing, may be changed by the user appropriately at the time of use, or may be determined automatically.

Figure 9:
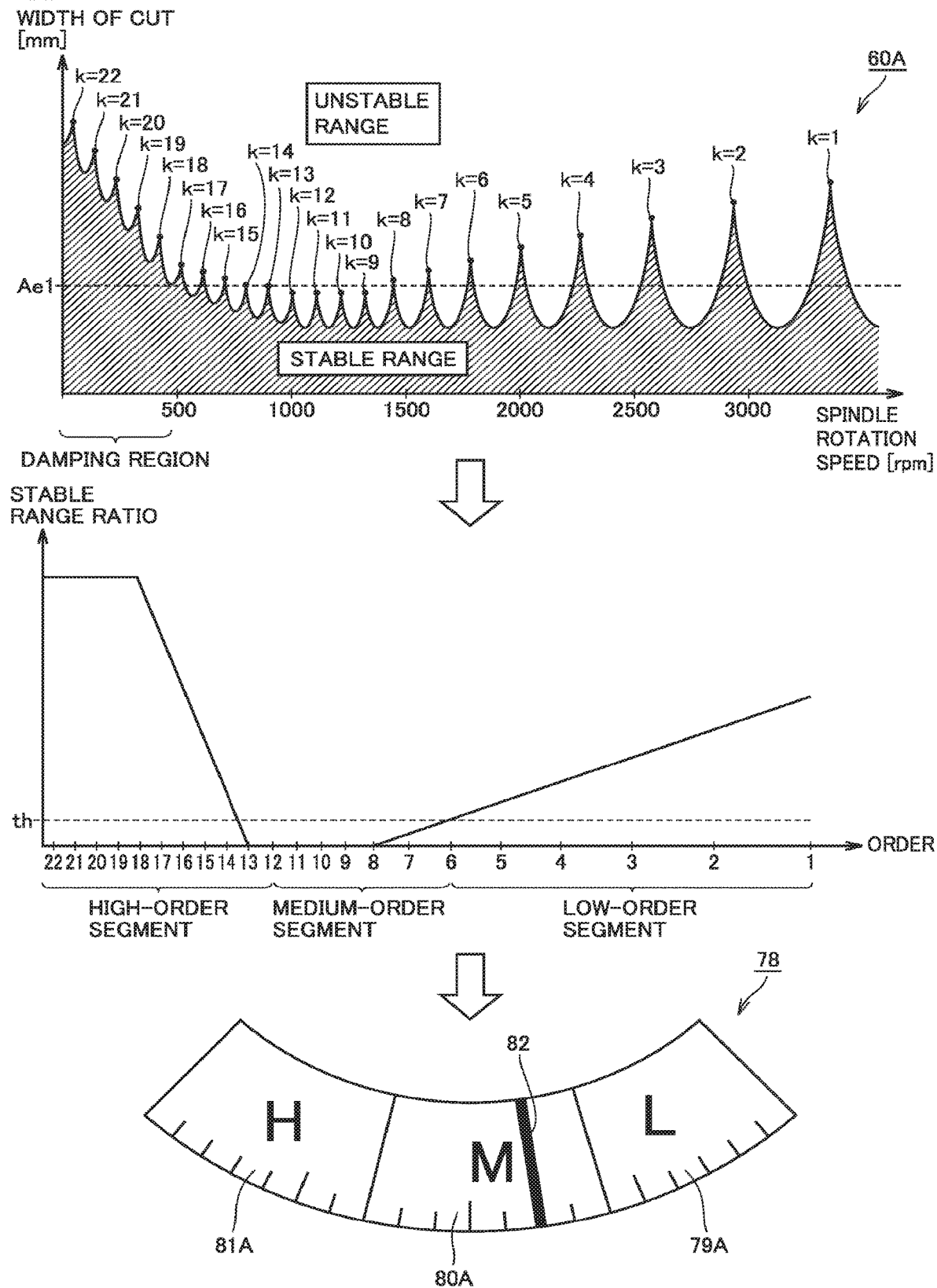
FIG. 9 is a conceptual view showing a process in which an order meter is generated from a stability limit diagram.

With reference to FIG. 9, the following describes a case where the respective ranges of the order segments are determined automatically. FIG. 9 is a conceptual view showing a process in which order meter 78 is generated from stability limit diagram 60A.

In accordance with generated stability limit diagram 60A, machine tool 100 changes each of the ranges of the orders represented by the order segments of order meter 78. As one example, machine tool 100 calculates a ratio (hereinafter, referred to as "stable range ratio") of the stable range in each section of the spindle rotation speed at the current width of cut Ae1, and determines the range of each order segment in accordance with the stable range ratio. As one example, machine tool 100 assigns medium-order segment 80A to a section in which the stable range ratio is smaller than a predetermined threshold value th. Next, machine tool 100 assigns low-order segment 79A to a section at a lower order side relative to medium-order segment 80A, and assigns high-order segment 81A to a section at a higher order side relative to medium-order segment 80A.

Accordingly, machine tool 100 can determine the range of each order segment in accordance with the size of the stable range. By checking the order segment to which the current order belongs, the user can readily judge whether or not the chatter vibration can be suppressed by adjusting the spindle rotation speed.

<E. Presentation of Operation Manner>

Next, the following describes a recommended operation manner presented upon generation of the regenerative chatter vibration. Each of FIG. 10 to FIG. 12 shows a presented, exemplary recommended operation manner.

Figure 10:
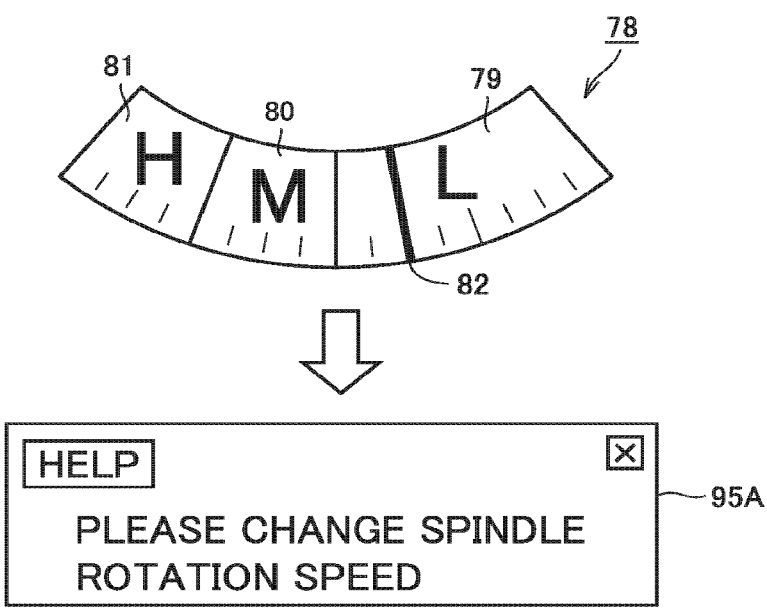
FIG. 10 shows a presented, exemplary recommended operation manner.

When the current order belongs to low-order segment 79 as shown in FIG. 10, machine tool 100 presents a recommended operation manner 95A on vibration monitoring screen 70. As described above, in low-order segment 79, the stable range exists close to the current spindle rotation speed. Hence, the regenerative chatter vibration can be suppressed by only adjusting the spindle rotation speed. Hence, when the current order segment belongs to low-order segment 79, machine tool 100 urges the user to change the spindle rotation speed by way of the presentation of operation manner 95A.

When the current order belongs to medium-order segment 80 as shown in FIG. 11, machine tool 100 presents a recommended operation manner 95B on vibration monitoring screen 70. As described above, no stable range exists in medium-order segment 80. Hence, the regenerative chatter vibration cannot be suppressed by adjusting the spindle rotation speed. Therefore, when the current order segment belongs to medium-order segment 80, machine tool 100 urges the user to decrease the width of cut of workpiece W to be smaller than the current width of cut by way of the presentation of operation manner 95B.

When the current order belongs to high-order segment 81 as shown in FIG. 12, machine tool 100 presents a recommended operation manner 95C on vibration monitoring screen 70. As described above, in high-order segment 81, the cutting condition can be included in the damping region by decreasing the spindle rotation speed to be lower than the current spindle rotation speed. Hence, when the current order segment belongs to high-order segment 81, machine tool 100 urges the user to decrease the spindle rotation speed to be lower than the current spindle rotation speed by way of the presentation of operation manner 95C. Moreover, in the damping region, the regenerative chatter vibration is not generated even when the width of cut is increased. Hence, machine tool 100 presents the user that there is no problem if the width of cut is increased to be larger than the current width of cut.

Figure 13:
FIG. 13 shows an exemplary data structure of order segment information.

A relation between the order segment and the recommended operation manner is defined in order segment information 124 shown in FIG. 13, for example. FIG. 13 shows an exemplary data structure of order segment information 124.

As shown in FIG. 13, in order segment information 124, for each order segment, a range of orders is associated with a recommended operation manner to be performed onto machine tool 100 in order to suppress the regenerative chatter vibration. From the order segments defined in order segment information 124, machine tool 100 specifies the order segment to which the current order belongs, and outputs the operation manner associated with the order segment. By presenting the recommended operation manner upon generation of the regenerative chatter vibration, the user can more intuitively judge which control parameter should be adjusted and how the control parameter should be adjusted.

<F. Hardware Configuration of Machine Tool 100>

Figure 14:
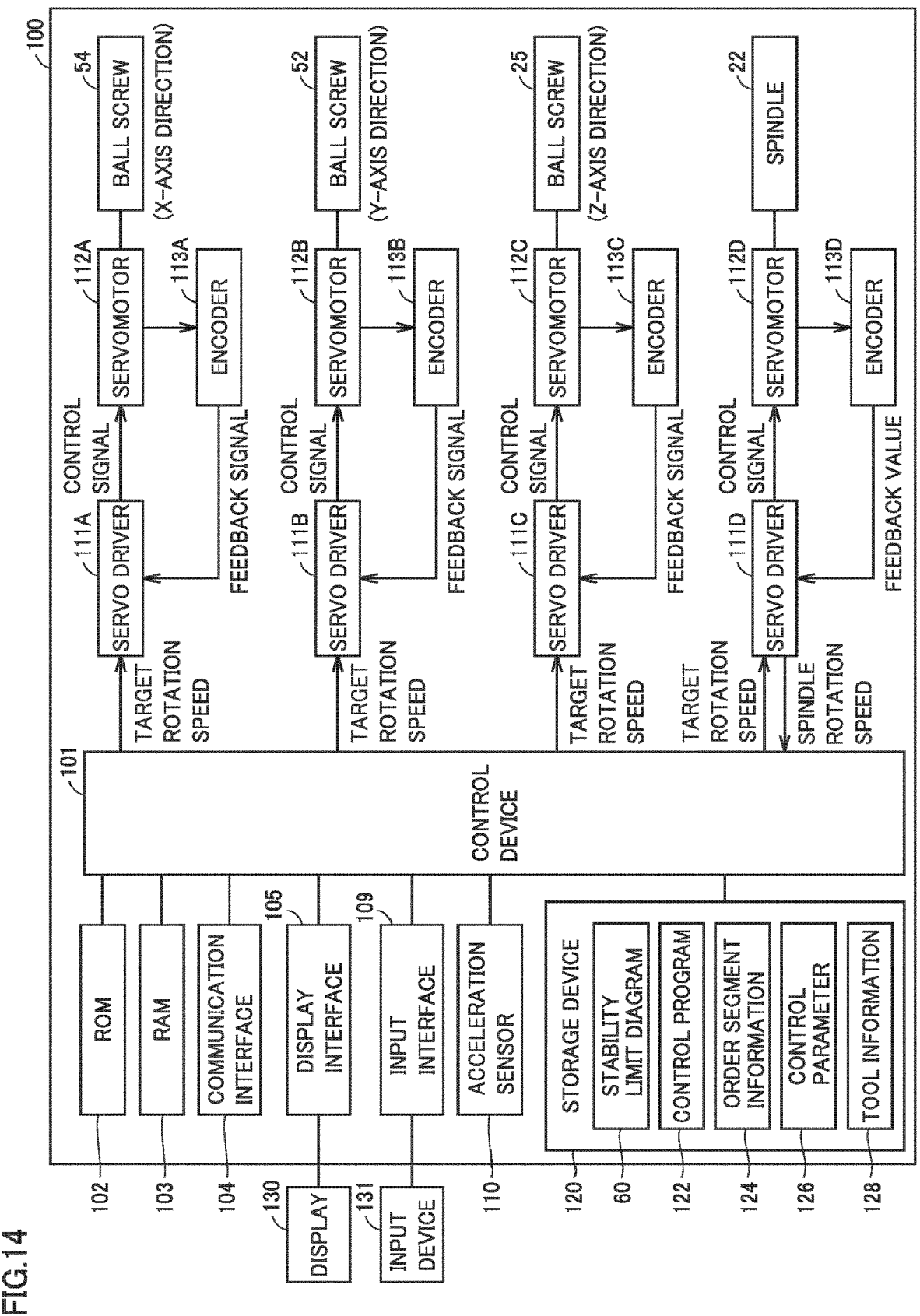
FIG. 14 is a block diagram showing a main hardware configuration of the machine tool according to the embodiment.

With reference to FIG. 14, the following describes an exemplary hardware configuration of machine tool 100. FIG. 14 is a block diagram showing a main hardware configuration of machine tool 100.

Machine tool 100 includes spindle 22, ball screws 25, 52, 54, control device 101, a ROM 102, a RAM 103, a communication interface 104, a display interface 105, an input interface 109, an acceleration sensor 110, servo drivers 111A to 111D, servomotors 112A to 112D, encoders 113A to 113D, and a storage device 120.

Control device 101 is a NC (Numerical Control) control device capable of executing a NC program, for example. The NC control device is constituted of at least one integrated circuit. For example, the integrated circuit is constituted of at least one CPU (Central Processing Unit), at least one ASIC (Application Specific Integrated Circuit), at least one FPGA (Field Programmable Gate Array), or a combination thereof.

Control device 101 controls an operation of machine tool 100 by executing various types of programs such as a control program 122 (NC program) of machine tool 100. Based on reception of an execution instruction for control program 122, control device 101 reads out control program 122 from storage device 120 to ROM 102. RANI 103 functions as a working memory to temporarily store various types of data required to execute control program 122. A LAN, an antenna, or the like is connected to communication interface 104.

Machine tool 100 exchanges data with an external communication device via communication interface 104. Examples of the external communication device include a server, other communication terminals, and the like. Machine tool 100 may be configured to download control program 122 from the communication terminal.

Display interface 105 is connected to a display device such as display 130. In accordance with a command from control device 101 or the like, display interface 105 sends, to display 130, an image signal for presenting an image. Examples of display 130 include a liquid crystal display, an organic EL display, or other display devices.

Input interface 109 can be connected to input device 131. Examples of input device 131 includes: a touch panel provided in display 130; a mouse; a keyboard; and other input devices that can receive a user operation.

Servo driver 111A sequentially receives an input of target rotation speed (or target position) from control device 101 to control servomotor 112A to rotate at the target rotation speed. More specifically, servo driver 111A calculates an actual rotation speed (or actual position) of servomotor 112A from a feedback signal of an encoder 113A. When the actual rotation speed is smaller than the target rotation speed, the rotation speed of servomotor 112A is increased, whereas when the actual rotation speed is larger than the target rotation speed, the rotation speed of servomotor 112A is decreased. In this way, servo driver 111A brings the rotation speed of servomotor 112A to be close to the target rotation speed while sequentially receiving the feedback of the rotation speed of servomotor 112A. Servo driver 111A moves table 55 (see FIG. 2), which is connected to ball screw 54, along the X-axis direction so as to move table 55 to an appropriate position in the X-axis direction.

By performing similar motor control, servo driver 111B moves guide 53 (see FIG. 2), which is connected to ball screw 52, along the Y-axis direction so as to move table 55 (see FIG. 2) on guide 53 to an appropriate position in the Y-axis direction. By performing similar motor control, servo driver 111C moves spindle head 21 (see FIG. 2), which is connected to ball screw 25, to an appropriate position in the Z-axis direction. By performing similar motor control, servo driver 111D controls the spindle rotation speed.

Storage device 120 is a storage medium such as a hard disk or a flash memory, for example. Storage device 120 stores: stability limit diagram 60; control program 122; order segment information 124 (see FIG. 13) described above; various types of control parameters 126 used for control program 122 (such as the spindle rotation speed, feed rate of spindle 22, and the widths of cut Ap, Ae); and tool information 128 that defines the diameter of each tool, the number of cutting edges of each tool, and the like. Storage locations for these are not limited to storage device 120. They may be stored in a storage region (for example, a cache region or the like) of control device 101, ROM 102, RAM 103, an external device (for example, a server), or the like.

Control program 122 may be provided to be included in a part of an appropriate program, rather than an individual program. In this case, the control process according to the present embodiment is implemented in cooperation with such an appropriate program. Such a program that does not include a part of modules is not deviated from the gist of control program 122 according to the present embodiment. Further, a part or whole of functions provided by control program 122 may be implemented by dedicated hardware. Further, machine tool 100 may be configured in such a manner as a cloud service in which at least one server performs a part of process of control program 122.

<G. Functional Configuration of Machine Tool 100>

Figure 15:
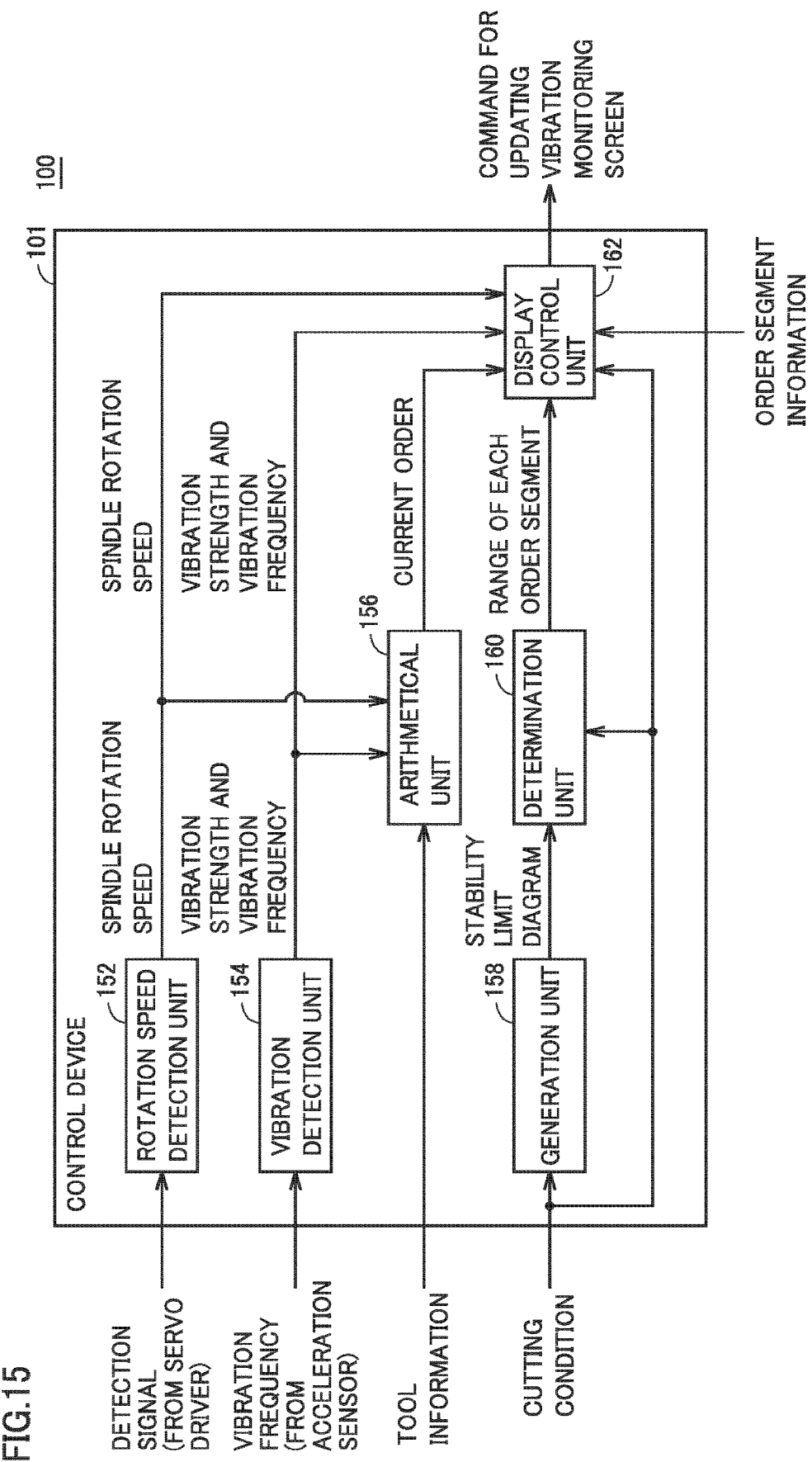
FIG. 15 shows an exemplary functional configuration of the machine tool according to the embodiment.

The following describes functions of machine tool 100 with reference to FIG. 15 and FIG. 16. FIG. 15 shows exemplary functional configurations of machine tool 100.

As shown in FIG. 15, as the functional configurations, control device 101 of machine tool 100 includes a rotation speed detection unit 152, a vibration detection unit 154, an arithmetical unit 156, a generation unit 158, a determination unit 160, and a display control unit 162.

In the description below, these functional configurations will be described sequentially.

(G1. Rotation Speed Detection Unit 152)

Rotation speed detection unit 152 detects a current spindle rotation speed. The spindle rotation speed can be detected by various methods. As one example, rotation speed detection unit 152 obtains, from servo driver 111D (see FIG. 14), the spindle rotation speed detected by encoder 113D (see FIG. 14). Alternatively, rotation speed detection unit 152 may obtain a command value (control signal) for the spindle rotation speed, the command value being output to servo driver 111D to control the rotation of spindle 22. Based on the command value, rotation speed detection unit 152 may detect the spindle rotation speed. The spindle rotation speed detected by rotation speed detection unit 152 is output to arithmetical unit 156 and display control unit 162.

(G2. Vibration Detection Unit 154)

Vibration detection unit 154 samples, at a predetermined sampling rate, an acceleration detected by acceleration sensor 110 (see FIG. 1) during machining of the workpiece, and performs fast Fourier transform (FFT) onto the sampling result.

FIG. 16 shows a sampled vibration frequency 69A. Vibration detection unit 154 performs frequency decomposition of vibration frequency 69A by performing the fast Fourier transform onto vibration frequency 69A, and calculates a vibration strength for each frequency. FIG. 16 shows a spectrum 69B as one example of the result of the Fourier transform. The horizontal axis of spectrum 69B represents the frequency. The vertical axis of spectrum 69B represents the vibration strength. The vibration strength represents an amplitude.

As the vibration strength of spindle 22 or tool 32, vibration detection unit 154 detects the maximum vibration strength among respective vibration strengths of frequencies indicated in spectrum 69B. In the example of FIG. 16, a vibration strength S at a frequency "f" is extracted. Whenever vibration strength S is detected, vibration strength S is output to arithmetical unit 156 and display control unit 162.

In the description above, it has been illustratively described that vibration strength S is calculated from the detection result of the acceleration in one direction; however, the vibration strength may be calculated from detection results of accelerations in a plurality of directions (for example, the X to Z directions shown in FIG. 1). In this case, the maximum value among the vibration strengths detected in the respective directions is employed as the vibration strength. Alternatively, an average value of the vibration strengths detected in the respective directions is calculated as the vibration strength.

(G3. Arithmetical Unit 156)

Arithmetical unit 156 calculates the current order based on the spindle rotation speed detected by rotation speed detection unit 152, the frequency of the regenerative chatter vibration detected by vibration detection unit 154, and the number of cutting edges of tool 32. The number of cutting edges of tool 32 is defined in tool information 128 (see FIG. 14), for example.

Typically, arithmetical unit 156 substitutes the spindle rotation speed, the frequency of the regenerative chatter vibration, and the number of cutting edges of tool 32 into the above-described formula (1), and calculates the calculation result as the current order. The calculated current order is output to display control unit 162.

(G4. Generation Unit 158)

Generation unit 158 generates stability limit diagram 60 based on the current cutting condition. The stability limit diagram is generated by various methods. As one example, stability limit diagram 60 is determined by using an analysis method contrived by Y. Altintas.

In the analysis method by Y. Altintas, equations of motion of tool 32 are expressed by a physical model with two degrees of freedom in the X direction and the Y direction as indicated in the following formulas (2) and (3).

(Formula 2)

$$x''+2G_x\omega_x x'+\omega_x^2 x = F_x/m_x \qquad (2)$$

(Formula 3)

$$y''+2G_y\omega_y y'+\omega_y^2 y = F_y/m_y \qquad (3)$$

"$\omega_x$" shown in the above-described formula represents a natural vibration frequency [rad/sec] of tool 32 in the X direction. "$\omega_y$" represents a natural vibration frequency [rad/sec] of tool 32 in the Y direction. "$G_x$" represents a damping ratio [%] in the X direction. "$G_y$" represents a damping ratio [%] in the Y direction. "$m_x$" represents an equivalent mass [kg] in the X direction. "$m_y$" represents an equivalent mass [kg] in the Y direction. "$F_x$" represents a cutting force [N], acting on tool 32, in the X direction. "$F_y$" represents a cutting force [N], acting on tool 32, in the Y direction. "x''" and "y''" represent respective second order differentials of time. "x'" and "y'" represent respective first order differentials of time.

Cutting forces "$F_x$" and "$F_y$" indicated in the above-described formulas (2) and (3) are determined by the following formulas (4) and (5).

(Formula 4)

$$i\ F_x = -K_t a_p h(\phi)\cos(\phi) - K_r K_t a_p h(\phi)\sin(\phi) \tag{4}$$

(Formula 5)

$$i\ F_y = +K_t a_p h(\phi)\sin(\phi) - K_r K_t a_p h(\phi)\cos(\phi) \tag{5}$$

"$h(\phi)$" shown in each of the above-described formulas represents a thickness [m²] by which the cutting edge of tool 32 cuts workpiece W. "$a_p$" represents a width of cut [mm] in the axial direction. "$K_t$" represents a specific cutting resistance [N/m²] of a main component force. "$K_r$" represents a ratio [%] of the main component force and radial force.

Cutting forces $F_x$ and $F_y$ are changed depending on the rotation angle "$\phi$" of tool 32. Hence, cutting forces $F_x$ and $F_y$ are integrated between an angle "$\phi_s$" at the start of cutting and an angle "$\phi_e$" at the end of cutting, and respective averages thereof are determined, thereby obtaining cutting forces $F_x$ and $F_y$. Moreover, each of the rotation angle "$\phi_s$" and the rotation angle "$\phi_e$" can be geometrically determined in accordance with: the diameter D [mm] of tool 32; width of cut $A_e$ [mm] in the radial direction; the feed direction; and whether the cutting is upper cutting or down cutting.

A characteristic value Λ in connection with each of the above-described formulas (2) and (3) is expressed by a below-described formula (6) with the number of regenerative chatter vibrations being represented by $\omega_e$. It should be noted that each variable of the right side of the formula (6) is determined from below-described formulas (7) to (14).

(Formula 6)

$$\Lambda = -(a_1 \pm (a_1^2 - 4a_0)^{1/2})/2a_0 \tag{6}$$

(Formula 7)

$$a_0 = \Phi_{xx}(i\omega_e)\Phi_{yy}(\omega_e)(\alpha_{xx}\alpha_{yy} - \alpha_{xy}\alpha_{yx}) \tag{7}$$

(Formula 8)

$$a_1 = \alpha_{xx}\Phi_{xx}(i\omega_e) + \alpha_{yy}\Phi_{yy}(i\omega_e) \tag{8}$$

(Formula 9)

$$\Phi_{xx}(i\omega_c) = 1/(m_x(-\omega_c^2 + 2iG_x\omega_c\omega_x + \omega_x^2)) \tag{9}$$

(Formula 10)

$$\Phi_{yy}(i\omega_c) = 1/(m_y(\omega_c^2 + 2iG_y\omega_c\omega_y + \omega_y^2)) \tag{10}$$

(Formula 11)

$$\alpha_{xx} = [(\cos 2\phi_e - 2K_r\phi_e|K_r \sin 2\phi_e) - (\cos 2\phi_g - 2K_r\phi_s|K_r \sin 2\phi_s)]/2 \tag{11}$$

(Formula 12)

$$\alpha_{xy} = [(-\sin 2\phi_e - K_r \cos 2\phi_e) - (-\sin 2\phi_s - 2\phi_s + K_r \cos 2\phi_s)]/2 \tag{12}$$

(Formula 13)

$$\alpha_{yx} = [(-\sin 2\phi_e + K_r \cos 2\phi_e) - (-\sin 2\phi_s + 2\phi_s + K_r \cos 2\phi_s)]/2 \tag{13}$$

(Formula 14)

$$\alpha_{yy} = [(-\cos 2\phi_e - K_r\phi_e - K_r \sin 2\phi_e) - (-\cos 2\phi_s - 2K_r\phi_s - K_r \sin 2\phi_s)]/2 \tag{14}$$

Next, assuming that the real part of the characteristic value "Λ" is represented by "$\Lambda_R$" and the imaginary part thereof is represented by "$\Lambda_I$", width of cut $a_{phim}$ in the axial direction and spindle rotation speed $n_{lim}$ at the stability limit are respectively represented by the following formula (15) and formula (16).

(Formula 15)

$$a_{plim} = 2\pi\Lambda_R(1 + (\Lambda_I/\Lambda_R)2)/(NK_t) \tag{15}$$

(Formula 16)

$$n_{lim} = 60\omega_e/(N(2k\pi + \pi - 2\tan^{-1}(\Lambda_I/\Lambda_R))) \tag{16}$$

Generation unit 158 generates stability limit diagram 60 by sequentially calculating limit width of cut "$a_{phim}$" and spindle rotation speed "$n_{lim}$" while appropriately changing respective values of "$\omega_e$" and "k" shown in the above-described expressions (15) and (16). In this way, generation unit 158 generates stability limit diagram 60 based on the predetermined formulas. Generated stability limit diagram 60 is output to determination unit 160.

(G5. Determination Unit 160)

Determination unit 160 determines the order range of each order segment shown in order meter 78 (see FIG. 8) in accordance with stability limit diagram 60 generated by generation unit 158. The method for determining the order range is the same as the one described with reference to FIG. 9 and is therefore not repeatedly described. The order range determined for each order segment is output to display control unit 162.

(G6. Display Control Unit 162)

Display control unit 162 controls presentation of vibration monitoring screen 70 (see FIG. 8) so as to provide the user with various types of information about the chatter vibration.

Further, display control unit 162 updates presentation of vibration meter 73 (see FIG. 8) in relation with the vibration strength detected by vibration detection unit 154.

Further, display control unit 162 presents the vibration frequency detected by vibration detection unit 154 on vibration monitoring screen 70.

Further, based on the range of each order segment determined by determination unit 160, display control unit 162 updates the range of each order segment presented on order meter 78. For example, the range of each order segment is updated whenever the stability limit diagram is generated by generation unit 158. Moreover, display control unit 162 updates the presentation of order meter 78 in relation with the current order calculated by arithmetical unit 156.

The current order may be presented on vibration monitoring screen 70 at any timing. In a certain aspect, the current order is always presented by display control unit 162. In another aspect, display control unit 162 presents the current order on vibration monitoring screen 70 based on detection of a chatter vibration. That is, in this case, the current order is presented while the chatter vibration is being detected, and the current order is not presented while no chatter vibration is being detected.

Preferably, when the vibration strength detected by vibration detection unit 154 becomes more than a predetermined value, display control unit 162 presents, on vibration monitoring screen 70, that a chatter vibration is being generated. On this occasion, display control unit 162 presents an operation manner according to the order segment to which the current order belongs. The method for presenting the operation manner is the same as the one described with reference to FIG. 10 to FIG. 12 and is therefore not described repeatedly.

<H. Control Structure of Machine Tool 100>

Figure 17:
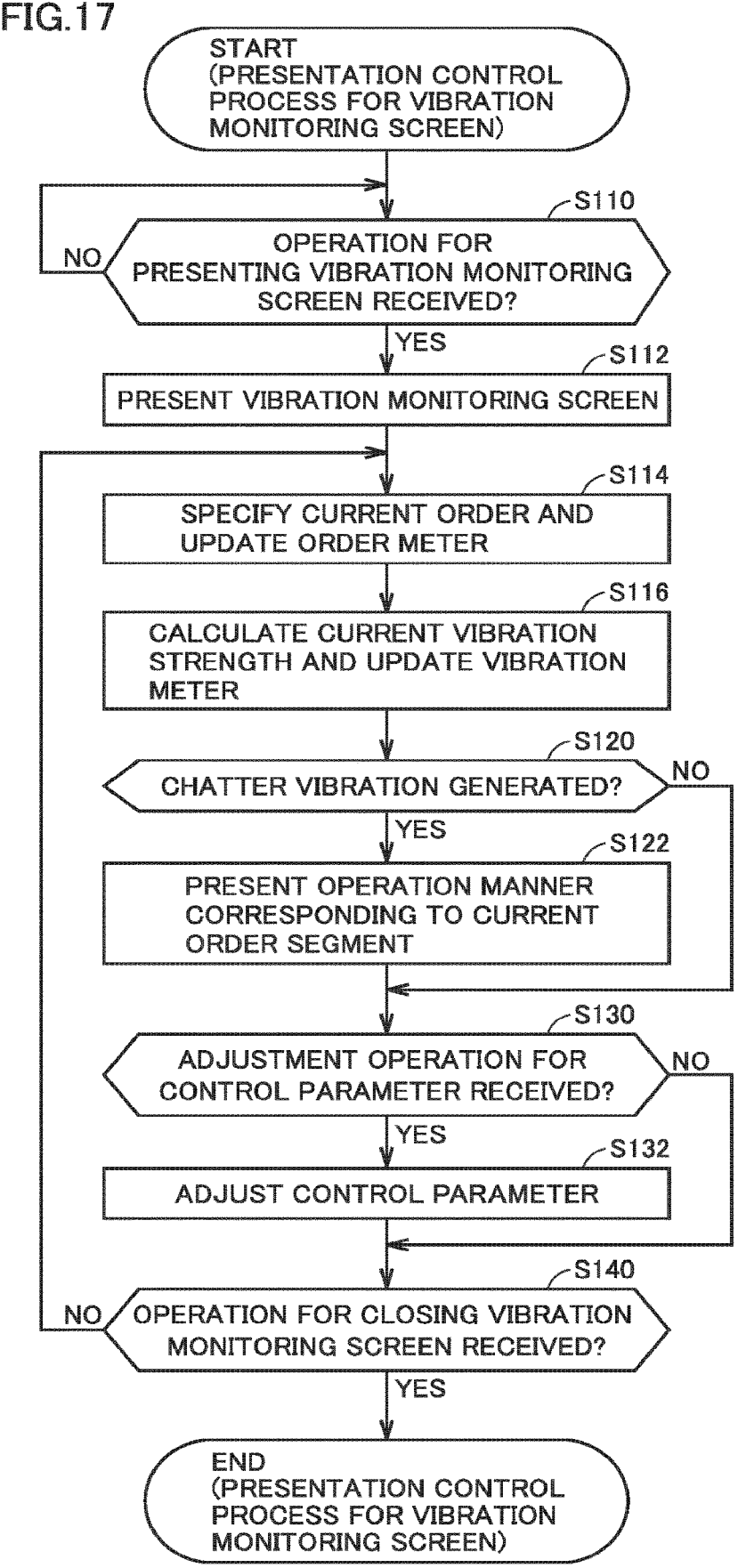
FIG. 17 is a flowchart showing a part of process performed by the machine tool according to the embodiment.

With reference to FIG. 17, the control structure of machine tool 100 will be described. FIG. 17 is a flowchart showing a part of process performed by machine tool 100.

The process shown in FIG. 17 is implemented by control device 101 (see FIG. 14) of machine tool 100 executing control program 122 (see FIG. 14). In another aspect, a part or whole of the process may be performed by a circuit element or another hardware.

In a step S110, control device 101 determines whether or not an operation for presenting vibration monitoring screen 70 (see FIG. 8) has been received. When control device 101 determines that the operation for presenting vibration monitoring screen 70 has been received (YES in step S110), control device 101 switches the control to a step S112. Otherwise (NO in step S110), control device 101 performs the process of step S110 again.

In step S112, control device 101 serves as display control unit 162 (see FIG. 15) to present vibration monitoring screen 70 on display 130.

In a step S114, control device 101 serves as arithmetical unit 156 (see FIG. 15) to calculate the current order based on the frequency of the chatter vibration, the spindle rotation speed, and the number of cutting edges of tool 32. The method for calculating the current order is the same as the one described above and is therefore not described repeatedly. Next, control device 101 serves as display control unit 162 to update order meter 78 (see FIG. 8) of vibration monitoring screen 70 in accordance with the calculated current order.

In a step S116, control device 101 serves as vibration detection unit 154 (see FIG. 15) to calculate the current vibration strength. The method for calculating the vibration strength is the same as the one described with reference to FIG. 16 and is therefore not described repeatedly. Next, control device 101 serves as display control unit 162 to update vibration meter 73 of vibration monitoring screen 70 in accordance with the calculated current vibration strength.

In a step S120, control device 101 determines whether or not a chatter vibration is being generated. As one example, when the vibration strength calculated in step S116 is more than the predetermined value, control device 101 determines that a chatter vibration is being generated. When control device 101 determines that the chatter vibration is being generated (YES in step S120), control device 101 switches the control to a step S122. Otherwise (NO in step S120), control device 101 switches the control to a step S130.

In step S122, control device 101 serves as display control unit 162 to specify an order segment to which the current order belongs, and presents, on vibration monitoring screen 70, an operation manner corresponding to the order segment. The method for presenting the operation manner is the same as the one described with reference to FIG. 10 to FIG. 12 and is therefore not described repeatedly.

In step S130, control device 101 determines whether or not an adjustment operation for a control parameter about the spindle rotation speed, the width of cut of workpiece W, or the like has been received. The adjustment operation is performed onto vibration monitoring screen 70, for example. When control device 101 determines that the adjustment operation for the control parameter has been received (YES in step S130), control device 101 switches the control to a step S132. Otherwise (NO in step S130), control device 101 switches the control to a step S140.

In a step S132, control device 101 adjusts the control parameter based on the adjustment operation received in step S130.

In step S140, control device 101 determines whether or not an operation for closing vibration monitoring screen 70 has been received. When control device 101 determines that the operation for closing vibration monitoring screen 70 has been received (YES in step S140), control device 101 ends the process shown in FIG. 17. Otherwise (NO in step S140), control device 101 returns the control to step S114.

<I. Modification of Vibration Monitoring Screen 70>

Figure 18:
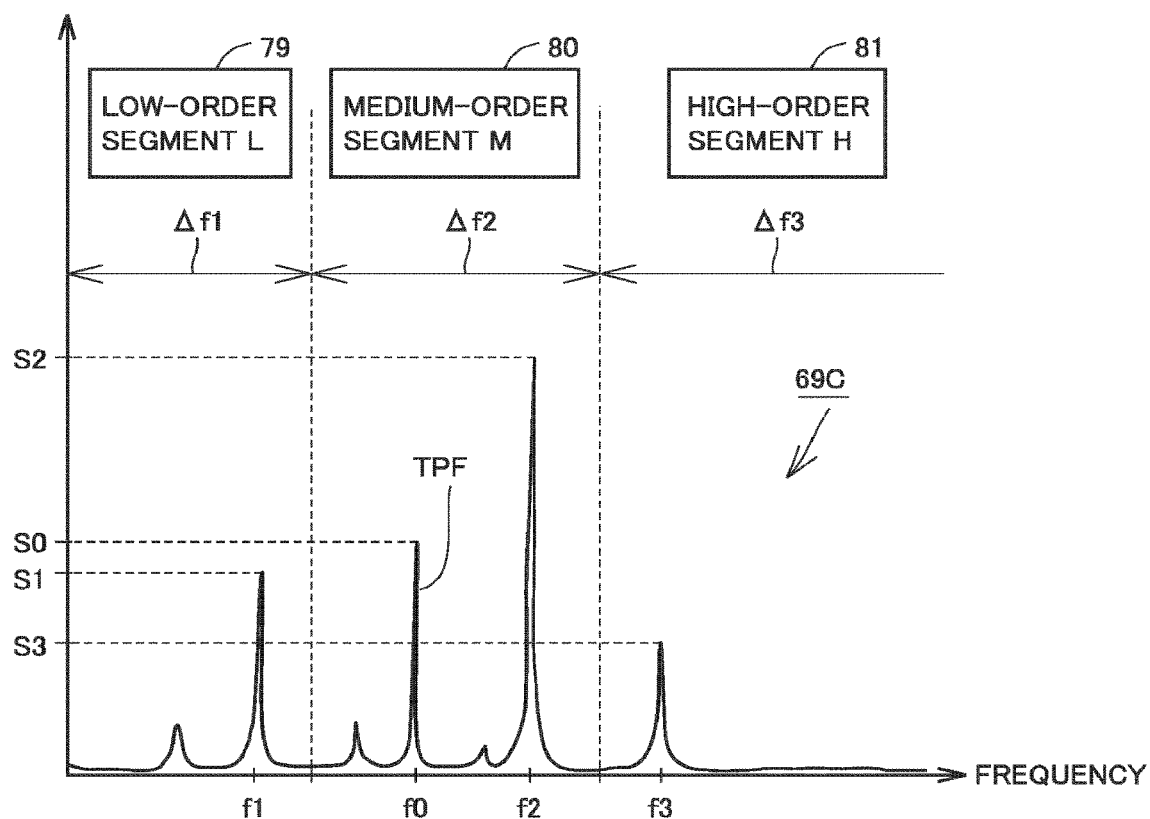
FIG. 18 shows a spectrum obtained by performing frequency decomposition to a vibration frequency detected by an acceleration sensor.
Figure 19:
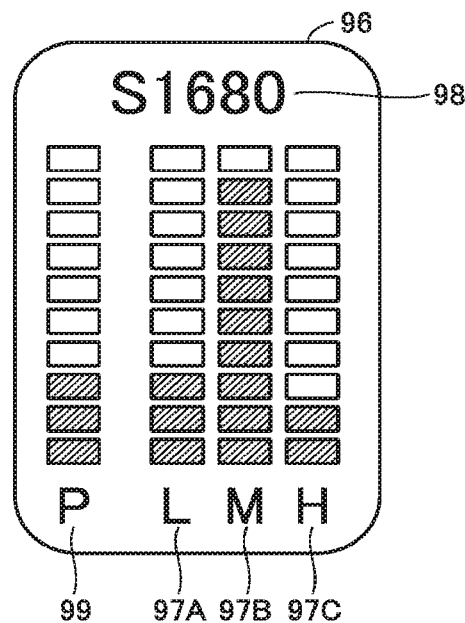
FIG. 19 shows a vibration strength distribution generated from the spectrum.

FIG. 18 shows a spectrum 69C obtained by performing frequency decomposition of a vibration frequency detected by acceleration sensor 110 (see FIG. 14). FIG. 19 shows a vibration strength distribution 96 generated from spectrum 69C.

With reference to FIG. 18 and FIG. 19, the following describes a modification of vibration monitoring screen 70 (see FIG. 8). Machine tool 100 according to the present modification further presents vibration strength distribution 96 on vibration monitoring screen 70.

Vibration strength distribution 96 is generated from spectrum 69C. Spectrum 69C represents one exemplary result of performing the Fourier transform onto the vibration frequency detected by acceleration sensor 110. The horizontal axis of spectrum 69C represents the frequency. The vertical axis of spectrum 69C represents the vibration strength.

As indicated in the above-described formula (1), the frequency represented in the horizontal axis of spectrum 69C is correlated with the order. Hence, the respective order segments shown in order meter 78 (see FIG. 8) correspond to different frequency ranges. In the example of FIG. 18, low-order segment 79 corresponds to a frequency range Δf1. Medium-order segment 80 corresponds to a frequency range Δf2. High-order segment 81 corresponds to a frequency range Δf3.

Control device 101 of machine tool 100 specifies the maximum vibration strength in each of frequency ranges Δf1 to Δf3. On this occasion, control device 101 preferably excludes the vibration strength of the tool passing frequency (TPF). Tool passing frequency f0 is calculated in accordance with the following formula (17).

(Formula 17)

$$f0 = n_0 \cdot N \qquad (17)$$

"$n_0$" shown in the formula (17) represents the spindle rotation speed. "N" represents the number of cutting edges of tool 32.

As a result of specifying the maximum vibration strength for each frequency range, a vibration strength S1 corresponding to frequency component f1 is specified in frequency range Δf1. A vibration strength S2 corresponding to frequency component f2 is specified in frequency range Δf2.

A vibration strength S3 corresponding to frequency component 13 is specified in frequency range Δf3.

Then, control device 101 reflects, in vibration strength meter 97A, vibration strength Si specified in low-order segment 79. Moreover, control device 101 reflects, in vibration strength meter 97B, vibration strength S2 specified in medium-order segment 80. Moreover, control device 101 reflects, in vibration strength meter 97C, vibration strength S3 specified in high-order segment 81.

Thus, control device 101 presents the vibration strength in the frequency range indicated by each order segment, in association with the order segment. Accordingly, the user can readily know in which order segment the vibration strength is high, thus allowing the user to perform an appropriate operation in order to suppress the chatter vibration.

Preferably, control device 101 normalizes each of vibration strengths S1 to S3 of the order segments with a vibration strength S0 corresponding to tool passing frequency f0. More specifically, control device 101 divides each of vibration strengths S1 to S3 by vibration strength S0, and respectively reflects the divided vibration strengths S1 to S3 in vibration strength meters 97A to 97C. Accordingly, control device 101 can absorb an influence of the vibration strength of tool passing frequency f0.

It should be noted that various information other than vibration strength meters 97A to 97C may be presented in vibration strength distribution 96. For example, a rotation speed meter 98 and a vibration strength meter 99 are presented in vibration strength distribution 96. Rotation speed meter 98 indicates the current spindle rotation speed. Vibration strength meter 99 indicates an overall vibration strength. For example, the vibration strength presented on vibration strength meter 99 may be an average value of the vibration strengths specified for the respective order segments, or may be the maximum value among the vibration strengths specified for the respective order segments.

<J. Conclusion>

In the manner described above, machine tool 100 presents, on display 130, the order information indicating the magnitude of the current order. By checking the magnitude of the current order, the user can judge what operation should be performed in order to suppress the chatter vibration. By presenting the current order in this way, machine tool 100 can assist the user in adjusting the control parameter.

<K. Appendix>

In one example of the present disclosure, a machine tool includes: a display; a tool configured to machine a workpiece; a spindle configured to rotate the tool or the workpiece; a sensor configured to detect a vibration frequency of the spindle or the tool; and a processor configured to control the machine tool. The processor is configured to: detect a chatter vibration in the spindle or the tool based on the vibration frequency; based on a frequency of the chatter vibration, a rotation speed of the spindle, and the number of cutting edges of the tool, calculate an order corresponding to the number of vibrations of the tool during a period of time until a current rotation angle of a first cutting edge of the tool reaches a current rotation angle of a second cutting edge of the tool; and present order information on the display, the order information indicating a magnitude of the calculated order.

In one example of the present disclosure, the processor is configured to: present, on the display, a plurality of order segments respectively representing different ranges of orders; and when presenting the order information on the display, present an order segment to which the calculated order belongs among the plurality of order segments in such a presentation manner that the order segment to which the calculated order belongs is distinguishable from other order segments.

In one example of the present disclosure, the plurality of order segments include a first order segment, and a second order segment representing a range of orders larger than an upper limit value of the first order segment. The processor is configured to increase a range of orders represented by the first order segment to be larger than the range of orders represented by the second order segment.

In one example of the present disclosure, the processor is configured to: generate a stability limit diagram based on a predetermined formula, the stability limit diagram indicating a limit of cutting condition under which no chatter vibration is generated in a cutting condition relation between a width of cut of the workpiece by the tool and the rotation speed of the spindle; and change the range of orders represented by each of the plurality of order segments in accordance with the generated stability limit diagram.

In one example of the present disclosure, the machine tool further includes a memory configured to store respective pieces of operation manner information in association with the plurality of order segments, the respective pieces of operation manner information defining manners of operations to be performed onto the machine tool in order to suppress the chatter vibration. The processor is configured to specify, based on detection of the chatter vibration, the order segment to which the calculated order belongs from the plurality of order segments, and output a piece of the operation manner information that is in association with the order segment to which the calculated order belongs.

In one example of the present disclosure, the plurality of order segments respectively correspond to different frequency ranges. The processor is configured to: calculate a vibration strength for each frequency through frequency decomposition of the vibration frequency; and present, on the display, a vibration strength in a frequency range represented by each of the plurality of order segments in association with the order segment.

In one example of the present disclosure, the processor is configured to present the order information on the display based on detection of the chatter vibration.

In another example of the present disclosure, a method for controlling a machine tool includes: rotating a spindle configured to drive to rotate a workpiece or a tool; detecting a vibration frequency of the spindle or the tool; detecting a chatter vibration in the spindle or the tool based on the vibration frequency; based on a frequency of the chatter vibration, a rotation speed of the spindle, and the number of cutting edges of the tool, calculating an order corresponding to the number of vibrations of the tool during a period of time until a current rotation angle of a first cutting edge of the tool reaches a current rotation angle of a second cutting edge of the tool; and presenting order information on a display of the machine tool, the order information indicating a magnitude of the calculated order.

In another example of the present disclosure, a computer-readable storage medium stores a program for controlling a machine tool and the program causes the machine tool to perform: rotating a spindle configured to drive to rotate a workpiece or a tool; detecting a vibration frequency of the spindle or the tool; detecting a chatter vibration in the spindle or the tool based on the vibration frequency; based on a frequency of the chatter vibration, a rotation speed of the spindle, and the number of cutting edges of the tool, calculating an order corresponding to the number of vibrations of the tool during a period of time until a current rotation angle of a first cutting edge of the tool reaches a current rotation angle of a second cutting edge of the tool; and presenting order information on a display of the machine tool, the order information indicating a magnitude of the calculated order.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A machine tool comprising:
a display;
a tool configured to machine a workpiece;
a spindle configured to rotate the tool or the workpiece;
a sensor configured to detect a vibration frequency of the spindle or the tool; and
a processor configured to control the machine tool, wherein the processor is configured to:
detect a chatter vibration in the spindle or the tool based on the vibration frequency, based on a frequency of the chatter vibration, a rotation speed of the spindle, and a number of cutting edges of the tool, calculate an order corresponding to a number of vibrations of the tool during a period of time until a current rotation angle of a first cutting edge of the tool reaches a current rotation angle of a second cutting edge of the tool,
present order information on the display, the order information indicating a magnitude of the calculated order,
present, on the display, a plurality of order segments respectively representing different ranges of orders, and
when presenting the order information on the display, present an order segment to which the calculated order belongs among the plurality of order segments in such a presentation manner that the order segment to which the calculated order belongs is distinguishable from other order segments.

2. The machine tool according to claim 1, wherein
the plurality of order segments include a first order segment, and a second order segment representing a range of orders larger than an upper limit value of the first order segment, and
the processor is configured to increase a range of orders represented by the first order segment to be larger than the range of orders represented by the second order segment.

3. The machine tool according to claim 1, wherein
the processor is configured to
generate a stability limit diagram based on a predetermined formula, the stability limit diagram indicating a limit of cutting condition under which no chatter vibration is generated in a cutting condition relation between a width of cut of the workpiece by the tool and the rotation speed of the spindle, and
change the range of orders represented by each of the plurality of order segments in accordance with the generated stability limit diagram.

4. The machine tool according to claim 1, further comprising a memory configured to store respective pieces of operation manner information in association with the plurality of order segments, the respective pieces of operation manner information defining manners of operations to be performed onto the machine tool in order to suppress the chatter vibration, wherein the processor is configured to specify, based on detection of the chatter vibration, the order segment to which the calculated order belongs from the plurality of order segments, and output a piece of the operation manner information that is in association with the order segment to which the calculated order belongs.

5. The machine tool according to claim 1, wherein
the plurality of order segments respectively correspond to different frequency ranges, and
the processor is configured to
calculate a vibration strength for each frequency through frequency decomposition of the vibration frequency, and
present, on the display, a vibration strength in a frequency range represented by each of the plurality of order segments in association with the order segment.

6. The machine tool according to claim 1, wherein the processor is configured to present the order information on the display based on detection of the chatter vibration.

7. A method for controlling a machine tool, the method comprising:
rotating a spindle configured to drive to rotate a workpiece or a tool;
detecting a vibration frequency of the spindle or the tool;
detecting a chatter vibration in the spindle or the tool based on the vibration frequency;
based on a frequency of the chatter vibration, a rotation speed of the spindle, and a number of cutting edges of the tool, calculating an order corresponding to a number of vibrations of the tool during a period of time until a current rotation angle of a first cutting edge of the tool reaches a current rotation angle of a second cutting edge of the tool;
presenting order information on a display of the machine tool, the order information indicating a magnitude of the calculated order; and
presenting, on the display, a plurality of order segments respectively representing different ranges of orders,
wherein when presenting the order information on the display, an order segment to which the calculated order belongs among the plurality of order segments is presented in such a presentation manner that the order segment to which the calculated order belongs is distinguishable from other order segments.

8. The method according to claim 7, wherein
the plurality of order segments include a first order segment, and a second order segment representing a range of orders larger than an upper limit value of the first order segment, and
when presenting the plurality of order segments on the display, a range of orders represented by the first order segment is presented to be larger than the range of orders represented by the second order segment.

9. The method according to claim 7, further comprising:
generating a stability limit diagram based on a predetermined formula, the stability limit diagram indicating a limit of cutting condition under which no chatter vibration is generated in a cutting condition relation between a width of cut of the workpiece by the tool and the rotation speed of the spindle; and
changing the range of orders represented by each of the plurality of order segments in accordance with the generated stability limit diagram.

10. The method according to claim 7, further comprising:
storing, in a memory, respective pieces of operation manner information in association with the plurality of order segments, the respective pieces of operation manner information defining manners of operations to be performed onto the machine tool in order to suppress the chatter vibration; and specifying, based on detection of the chatter vibration, the order segment to which the calculated order belongs from the plurality of order segments, and outputting a piece of the operation manner information that is in association with the order segment to which the calculated order belongs.

11. The method according to claim 7, wherein the plurality of order segments respectively correspond to different frequency ranges, the method further comprising:

calculating a vibration strength for each frequency through frequency decomposition of the vibration frequency; and presenting, on the display, a vibration strength in a frequency range represented by each of the plurality of order segments in association with the order segment.

12. The method according to claim 7, wherein the order information is presented on the display based on detection of the chatter vibration.

13. A computer-readable storage medium storing a program for controlling a machine tool, the program causing the machine tool to perform:

rotating a spindle configured to drive to rotate a workpiece or a tool;

detecting a vibration frequency of the spindle or the tool;

detecting a chatter vibration in the spindle or the tool based on the vibration frequency;

based on a frequency of the chatter vibration, a rotation speed of the spindle, and a number of cutting edges of the tool, calculating an order corresponding to a number of vibrations of the tool during a period of time until a current rotation angle of a first cutting edge of the tool reaches a current rotation angle of a second cutting edge of the tool;

presenting order information on a display of the machine tool, the order information indicating a magnitude of the calculated order; and presenting, on the display, a plurality of order segments respectively representing different ranges of orders, wherein when presenting the order information on the display, an order segment to which the calculated order belongs among the plurality of order segments is presented in such a presentation manner that the order segment to which the calculated order belongs is distinguishable from other order segments.

14. The computer-readable storage medium according to claim 13, wherein the plurality of order segments include a first order segment, and a second order segment representing a range of orders larger than an upper limit value of the first order segment, and when presenting the plurality of order segments on the display, a range of orders represented by the first order segment is presented to be larger than the range of orders represented by the second order segment.

15. The computer-readable storage medium according to claim 13, wherein the program causes the machine tool to further perform generating a stability limit diagram based on a predetermined formula, the stability limit diagram indicating a limit of cutting condition under which no chatter vibration is generated in a cutting condition relation between a width of cut of the workpiece by the tool and the rotation speed of the spindle, and changing the range of orders represented by each of the plurality of order segments in accordance with the generated stability limit diagram.

16. The computer-readable storage medium according to claim 13, wherein the program causes the machine tool to further perform storing, in a memory, respective pieces of operation manner information in association with the plurality of order segments, the respective pieces of operation manner information defining manners of operations to be performed onto the machine tool in order to suppress the chatter vibration, and specifying, based on detection of the chatter vibration, the order segment to which the calculated order belongs from the plurality of order segments, and outputting a piece of the operation manner information that is in association with the order segment to which the calculated order belongs.

17. The computer-readable storage medium according to claim 13, wherein the plurality of order segments respectively correspond to different frequency ranges, and the program causes the machine tool to further perform calculating a vibration strength for each frequency through frequency decomposition of the vibration frequency, and presenting, on the display, a vibration strength in a frequency range represented by each of the plurality of order segments in association with the order segment.

* * * * *